(12) United States Patent
Takano et al.

(10) Patent No.: US 7,975,284 B2
(45) Date of Patent: Jul. 5, 2011

(54) IMAGE CAPTURING SYSTEM, IMAGE CAPTURING APPARATUS, AND IMAGE CAPTURING METHOD

(75) Inventors: Kosuke Takano, Fujisawa (JP); Naofumi Yoshida, Yokohama (JP); Shuichi Kurabayashi, Fujisawa (JP)

(73) Assignee: Empire Technology Development LLC, Wilmington, DE (US)

( * ) Notice: Subject to any disclaimer, the term of this patent is extended or adjusted under 35 U.S.C. 154(b) by 63 days.

(21) Appl. No.: 12/568,188

(22) Filed: Sep. 28, 2009

(65) Prior Publication Data

US 2010/0231750 A1    Sep. 16, 2010

(30) Foreign Application Priority Data

Mar. 13, 2009    (JP) ................. 2009-060544

(51) Int. Cl.
*H04N 7/173* (2006.01)
*H04N 5/232* (2006.01)
(52) U.S. Cl. ................. 725/105; 348/211.11; 348/222.1
(58) Field of Classification Search ............ 348/211.11, 348/211.9; 725/105
See application file for complete search history.

(56) References Cited

U.S. PATENT DOCUMENTS

| | | | |
|---|---|---|---|
| 2006/0056625 A1* | 3/2006 | Nakabayashi et al. | 380/46 |
| 2008/0225137 A1* | 9/2008 | Kubo et al. | 348/231.2 |
| 2008/0239083 A1* | 10/2008 | Kusaka et al. | 348/207.1 |
| 2008/0270922 A1* | 10/2008 | Kii et al. | 715/764 |
| 2009/0324211 A1* | 12/2009 | Strandell et al. | 396/310 |
| 2010/0234694 A1* | 9/2010 | Takano et al. | 600/300 |

FOREIGN PATENT DOCUMENTS

| | | |
|---|---|---|
| JP | 2004-194174 | 7/2004 |
| JP | 2008-306464 | 12/2008 |
| WO | WO 2006/018962 | 2/2006 |

OTHER PUBLICATIONS

Kurabayashi, et al., "Active Multidatabase System for Mobile Computing Environment," Institute of Electronics, Information and Communication Engineers, vol. 100, No. 228, 2000, 9 pages.
Kurabayashi, et al., "A Multidatabase System Architecture for Integrating Heterogeneous Databases with Meta-Level Active Rule Primitives," Proceedings of the 20th IASTED International Conference on Applied Informatics, Feb. 2002, 10 pages.

* cited by examiner

*Primary Examiner* — Hung H Lam
(74) *Attorney, Agent, or Firm* — Foley & Lardner LLP

(57) ABSTRACT

An image capturing apparatus is configured so that optimal one of usable position detecting sensors is selected. Specifically, among a plurality of position detecting sensors usable by the image capturing apparatus, e.g., a GPS, a direction sensor, an acceleration sensor, and a velocity sensor, the GPS detects position information at a position where GPS signals can be received, whereas another of the sensors detects position information at a position where GPS signals cannot be received, in accordance with an environment where an image is captured. The position information detected by the optimal sensor is added to an image captured by a camera in a specified form and is displayed or stored.

10 Claims, 21 Drawing Sheets

FIG. 6

| SERVICES | SENSORS FOR SERVICE AND THEIR PRIORITIES | | | | | | | | | | | | | | | | SETS OF MODULES FOR SERVICES | PRIORITIES OF SERVICES |
|---|---|---|---|---|---|---|---|---|---|---|---|---|---|---|---|---|---|---|
| | 162 | 164 | 166 | 168 | 170 | 172 | 174 | 176 | 178 | 180 | 182 | 184 | 186 | 190-1 | | 190-n | | |
| S#1 (HEALTH CHECK) | 0 | 3 | 1 | 0 | 0 | 2 | 0 | 0 | 0 | 0 | 0 | 0 | 0 | 0 | | 0 | MS#1 | 2 |
| S#j (NAVIGATION) | 0 | 0 | 0 | 0 | 0 | 0 | 0 | 1 | 2 | 2 | 2 | 0 | 0 | 0 | | 0 | MS#j | 1 |
| S#j+1 (IMAGE INFORMATION) | 0 | 0 | 0 | 0 | 0 | 0 | 0 | 1 | 2 | 2 | 2 | 0 | 0 | 0 | | 0 | MS#j+1 | 4 |
| S#j | $N_{j1}$ | $N_{j2}$ | $N_{j3}$ | $N_{j4}$ | $N_{j5}$ | $N_{j6}$ | $N_{j7}$ | $N_{j8}$ | $N_{j9}$ | $N_{j10}$ | $N_{j11}$ | $N_{j12}$ | $N_{j13}$ | $N_{j14}$ | | $N_{jk}$ | MS#j | 1 |
| S#n | $N_{n1}$ | $N_{n2}$ | $N_{n3}$ | $N_{n4}$ | $N_{n5}$ | $N_{n6}$ | $N_{n7}$ | $N_{n8}$ | $N_{n9}$ | $N_{n10}$ | $N_{n11}$ | $N_{n12}$ | $N_{n13}$ | $N_{n14}$ | | $N_{nk}$ | MS#n | 3 |

FIG. 7

| SERVICES | PARAMETERS FOR MODULES | | | | | | | | |
|---|---|---|---|---|---|---|---|---|---|
| | #1 | #2 | | #j | #(j+1) | #(j+2) | #(j+3) | | #n |
| S#1 (HEALTH CHECK) | $P'_{11}$ | $P'_{12}$ | | - | - | - | | | - |
| | | | | | | | | | |
| S#i (NAVIGATION) | - | - | | $P'_{ij}$ | $P'_{i(j+1)}$ | $P'_{i(j+2)}$ | | | |
| S#i+1 (IMAGE INFORMATION) | - | - | | $P'_{ij}$ | $P'_{i(j+1)}$ | | $P'_{i(j+3)}$ | | |
| | | | | | | | | | |
| S#n | $P'_{n1}$ | $P'_{n2}$ | | $P'_{nj}$ | $P'_{n(j+1)}$ | $P'_{n(j+2)}$ | | | $P'_{nn}$ |

FIG. 8

PARAMETERS FOR SENSORS

| SERVICES | | 160 | 162 | 166 | 168 | 170 | 172 | 174 | 176 | 178 | 180 | 182 | 184 | 186 | 190-1 | | 190-n |
|---|---|---|---|---|---|---|---|---|---|---|---|---|---|---|---|---|---|
| S#1 | (HEALTH CHECK) | – | $P_{12}$ | $P_{13}$ | – | – | $P_{16}$ | – | – | – | – | – | – | – | – | | – |
| S#i | (NAVIGATION) | – | – | – | – | – | – | – | $P_{i8}$ | $P_{i9}$ | $P_{i10}$ | $P_{i11}$ | $P_{i12}$ | – | – | | – |
| S#i+1 | (IMAGE INFORMATION) | – | – | – | – | – | – | – | $P_{i8}$ | $P_{i9}$ | $P_{i10}$ | $P_{i11}$ | $P_{i12}$ | – | – | | – |
| S#j | | $P_{j1}$ | $P_{j2}$ | $P_{j3}$ | $P_{j4}$ | $P_{j5}$ | $P_{j6}$ | $P_{j7}$ | $P_{j8}$ | $P_{j9}$ | $P_{j10}$ | $P_{j11}$ | $P_{j12}$ | $P_{j13}$ | $P_{j14}$ | | $P_{jk}$ |
| S#n | | $P_{n1}$ | $P_{n2}$ | $P_{n3}$ | $P_{n4}$ | $P_{n5}$ | $P_{n6}$ | $P_{n7}$ | $P_{n8}$ | $P_{n9}$ | $P_{n10}$ | $P_{n11}$ | $P_{n12}$ | $P_{n13}$ | $P_{n14}$ | | $P_{nk}$ |

FIG. 15

| SERVICES | SENSORS FOR SERVICE AND THEIR PRIORITIES | | | | | | | | | | | | | | | | SETS OF MODULES FOR SERVICES | PRIORITIES OF SERVICES |
|---|---|---|---|---|---|---|---|---|---|---|---|---|---|---|---|---|---|---|
| | 162 | 164 | 166 | 168 | 170 | 172 | 174 | 176 | 178 | 180 | 182 | 184 | 186 | 190-1 | ... | 190-n | | |
| S#1 (HEALTH CHECK) | 0 | 3 | 1 | 0 | 0 | 2 | 0 | 0 | 0 | 0 | 0 | 0 | 0 | 0 | | 0 | MS#1 | 2 |
| S#i (NAVIGATION) | 0 | 0 | 0 | 0 | 0 | 0 | 0 | 1 | 2 | 2 | 2 | 0 | 0 | 0 | | 0 | MS#i | 1 |
| S#i+1 (IMAGE INFORMATION) | 0 | 0 | 0 | 0 | 0 | 0 | 0 | 1 | 2 | 2 | 2 | 0 | 0 | 0 | | 0 | MS#i | 1 |
| S#m (WEB BROWSER) | 1/2 | 1/2 | 0 | 1 | 0 | 0 | 0 | 0 | 0 | 0 | 0 | 0 | 1 | 0 | | 0 | MS#j | 1 |
| S#n | $N_{n1}$ | $N_{n2}$ | $N_{n3}$ | $N_{n4}$ | $N_{n5}$ | $N_{n6}$ | $N_{n7}$ | $N_{n8}$ | $N_{n9}$ | $N_{n10}$ | $N_{n11}$ | $N_{n12}$ | $N_{n13}$ | $N_{n14}$ | | $N_{nk}$ | MS#n | 3 |

FIG. 16

| SERVICES | PARAMETERS FOR SENSORS | | | | | | | | | | | | | | | | |
|---|---|---|---|---|---|---|---|---|---|---|---|---|---|---|---|---|---|
| | 160 | 162 | 166 | 168 | 170 | 172 | 174 | 176 | 178 | 180 | 182 | 184 | 186 | 190-1 | ... | 190-n |
| S#1 (HEALTH CHECK) | - | $P_{12}$ | $P_{13}$ | - | - | $P_{16}$ | - | - | - | - | - | - | - | - | | - |
| S#i (NAVIGATION) | - | - | - | - | - | - | - | $P_{i8}$ | $P_{i9}$ | $P_{i10}$ | $P_{i11}$ | $P_{i12}$ | - | - | | - |
| S#i+1 (IMAGE INFORMATION) | - | - | - | - | - | - | - | $P_{i8}$ | $P_{i9}$ | $P_{i10}$ | $P_{i11}$ | $P_{i12}$ | - | - | | - |
| S#m (WEB BROWSER) | $P_{m1}$ | $P_{m2}$ | - | $P_{m4}$ | - | - | - | - | - | - | - | - | $P_{m13}$ | - | | - |
| S#n | $P_{n1}$ | $P_{n2}$ | $P_{n3}$ | $P_{n4}$ | $P_{n5}$ | $P_{n6}$ | $P_{n7}$ | $P_{n8}$ | $P_{n9}$ | $P_{n10}$ | $P_{n11}$ | $P_{n12}$ | $P_{n13}$ | $P_{n14}$ | | $P_{nk}$ |

FIG. 17

| SERVICES | PARAMETERS FOR MODULES | | | | | | | | | | |
|---|---|---|---|---|---|---|---|---|---|---|---|
| | #1 | #2 | # | #(i+1) | #(i+2) | #(i+3) | | #p | #(p+1) | #(p+2) | #n |
| S#1 (HEALTH CHECK) | P'₁₁ | P'₁₂ | - | - | - | - | | | | | - |
| S#i (NAVIGATION) | - | - | P'ᵢⱼ | P'ᵢ(ⱼ₊₁) | P'ᵢ(ⱼ₊₂) | - | | | | | |
| S#i+1 (IMAGE INFORMATION) | - | - | P'ᵢⱼ | P'ᵢ(ⱼ₊₁) | - | P'ᵢ(ⱼ₊₁)(ⱼ₊₃) | | | | | |
| S#m (WEB BROWSER) | - | - | | | | | | P'ₘₚ | P'ₘ(ₚ₊₁) | P'ₘ(ₚ₊₂) | P'ₘₙ |
| S#n | P'ₙ₁ | P'ₙ₂ | P'ₙⱼ | P'ₙ(ⱼ₊₁) | P'ₙ(ⱼ₊₂) | - | | | | | P'ₙₙ |

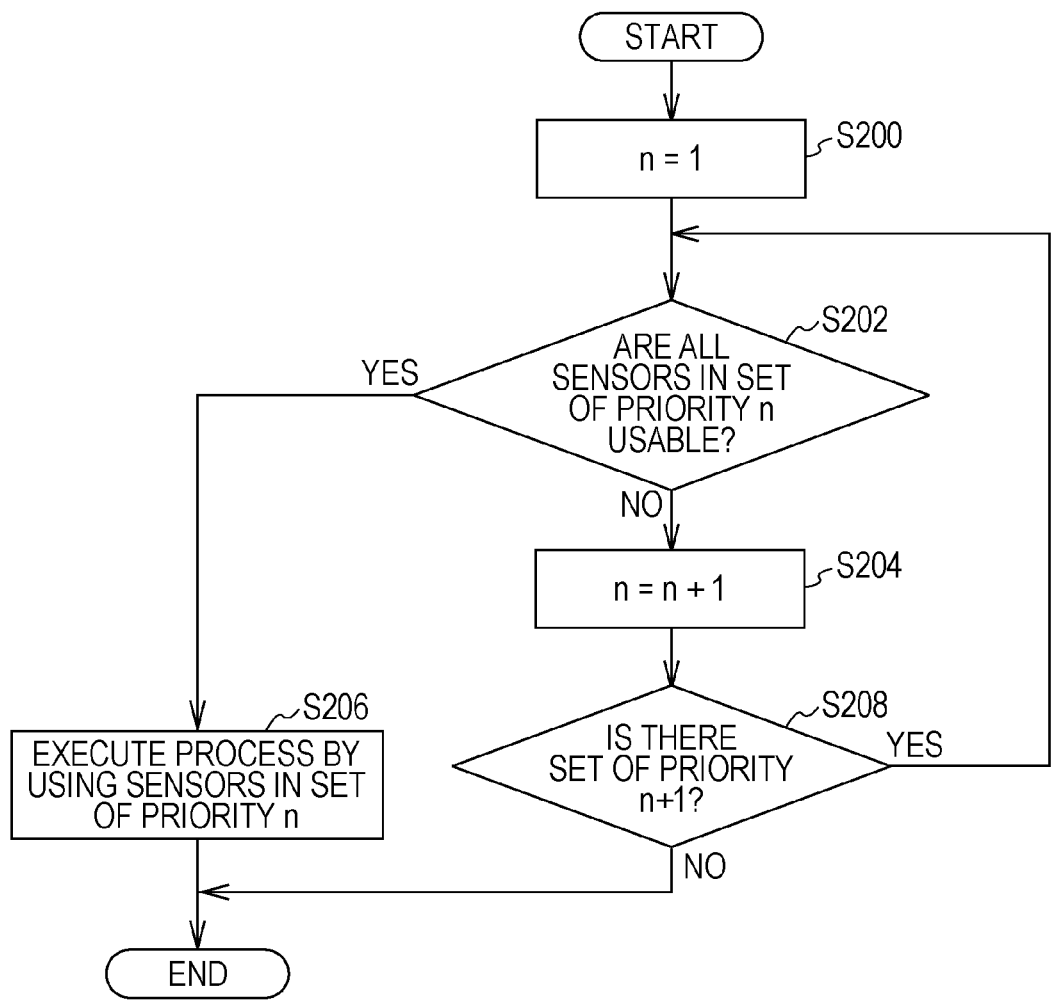

IMAGE CAPTURING SYSTEM, IMAGE CAPTURING APPARATUS, AND IMAGE CAPTURING METHOD

CROSS-REFERENCE TO RELATED APPLICATIONS

The present application claims the benefit of Japanese Application No. 2009-060544, filed on Mar. 13, 2009, the entire contents of which is incorporated herein by reference in its entirety.

BACKGROUND OF THE INVENTION

1. Field of the Invention

The present invention relates to an image capturing system, an image capturing apparatus, and an image capturing method that provide image information by using sensors.

2. Description of the Related Art

For example, non-patent document 1 (Shuichi Kurabayashi, Naoki Ishibashi, and Yasushi Kiyoki, "Active Multidatabase System for Mobile Computing Environment", IPSJ (Information Processing Society of Japan) SIG notes, 2000-DBS-122, 2000, 463-470) and non-patent document 2 (Shuichi Kurabayashi, Naoki Ishibashi, and Yasushi Kiyoki: A Multidatabase System Architecture for Integrating Heterogeneous Databases with Meta-Level Active Rule Primitives. In Proceedings of the 20th IASTED International Conference on Applied Informatics, 2002, 378-387.) disclose an active meta-level system for dynamically connecting devices such as databases to each other.

However, those documents do not disclose, not so much as suggest, an image capturing system, an image capturing apparatus, and an image capturing method that provide image information by adaptively using sensors.

SUMMARY OF THE INVENTION

An image capturing apparatus according to the disclosure of the present application has been made under the above-described background, and includes one or more sensor driving modules, one or more service executing modules, an input device configured to receive an input of specifying a plurality of image capturing services and a method for adding position information to image information obtained through the specified image capturing services, a selector configured to select the one or more sensor driving modules and the one or more service executing modules necessary to realize the specified image capturing services on the basis of correspondence information indicating correspondence between each of the plurality of image capturing services and the one or more sensor driving modules and the one or more service executing modules necessary to realize the image capturing services, a plurality of types of position sensors each of which is compatible with any of the sensor driving modules and detects position information from an object of image capturing in accordance with the type, an executing device configured to execute the selected sensor driving modules and service executing modules, and to receive/transmit information input/output between the modules so that the specified image capturing services are realized, thereby realizing the specified image capturing services, and a camera configured to shoot an object and generate image information of still and moving images of the object or any of the still and moving images. The sensor driving module that is executed drives the position sensor compatible with the sensor driving module to detect position information of the object according to the type of the position sensor and outputs the position information as position sensor information. The service executing module that is executed adds the position information output from the sensor driving module to the image information obtained through capturing by the camera in an externally-specified form.

Here, an outline of matters disclosed in the present application will be described.

The description given here is intended to help the understanding of the matters disclosed in the present application and is not intended to limit the technical scope thereof.

The image capturing apparatus disclosed in the present application is configured to be capable of detecting the context of a user by using a hybrid set of different types of sensor functions, and is also called "hybrid sensing system".

The image capturing apparatus disclosed in the present application includes a plurality of types of position detecting sensors, such as a GPS (Global Positioning System), a direction sensor, an acceleration sensor, and a velocity sensor, and a camera capable of capturing moving and still images or any of the moving and still images.

In a case where an image capturing service, in which the position of the image capturing apparatus, the place name of the position, and the like are added to a captured image, is provided as an information service, information obtained by the GPS, the direction sensor, and the acceleration sensor among the above-described sensors needs to be processed.

Furthermore, in this case, the most accurate position information can be obtained when position information obtained by the GPS is used, and the accuracy of the position information decreases when the direction sensor and the acceleration sensor are used for providing a service.

On the other hand, according to a position detecting method using the direction and the acceleration sensor, position information can be obtained even in a site where radio waves of the GPS cannot be got.

That is, in a case where position detection is performed in various positions, different position detecting sensors need to be used in the respective positions.

Furthermore, in order to maintain the quality as high as possible in the same information service, sensors to be used need to be changed in accordance with conditions.

For example, in a navigation service, the accuracy is the highest when the GPS is used as a sensor in a site where radio signals of the GPS can be got, such as outdoors. However, there is no choice but using another sensor having lower accuracy in a site where radio signals of the GPS cannot be got, such as an underground area.

The image capturing apparatus disclosed in the present application is devised from the above-described point of view, and is configured so that any optimal sensor is selected from among usable position detecting sensors according to an environment or the like where image capturing is performed among a plurality of position detecting sensors usable by the image capturing apparatus.

Also, the image capturing apparatus disclosed in the present application is configured so that appropriate parameters are selected for and set to a position detecting sensor and a process program so that position information and the like attached to an image can be appropriately obtained.

Technical advantages disclosed in the present application and other technical advantages will be apparent to those skilled in the art by reading the following detailed description of embodiments illustrated in the attached drawings.

The attached drawings are integrated with the specification and constitute part of the specification, illustrate the embodiments disclosed in the present application, and play a role of explaining the principle disclosed in the present application together with the description of the embodiments.

It should be understood that the drawings that are referred to in this specification are not drawn to scale unless otherwise noted.

BRIEF DESCRIPTION OF THE DRAWINGS

FIG. 6 is a first diagram illustrating a first service definition table stored in an input analyzing DB illustrated in FIG. 4;

FIG. 7 is a first diagram illustrating a service execution parameter table stored in a parameter DB illustrated in FIG. 4;

FIG. 8 is a first diagram illustrating a sensor parameter table stored in the parameter DB illustrated in FIG. 4;

FIG. 15 is a second diagram illustrating a second service definition table stored in the input analyzing DB illustrated in FIG. 4;

FIG. 16 is a second diagram illustrating a sensor parameter table stored in the parameter DB illustrated in FIG. 4;

FIG. 17 is a second diagram illustrating a service execution parameter table stored in the parameter DB illustrated in FIG. 4;

FIG. 20 is a flowchart illustrating a process of the terminal program illustrated in FIG. 4 in a case where there exist three or more sets of sensors for realizing an information service.

DESCRIPTION OF THE PREFERRED EMBODIMENTS

First Embodiment

Hereinafter, a first embodiment disclosed in the present application will be described in detail.

Embodiments disclosed in the present application are illustrated in the attached drawings.

The disclosure of the present application will be described in relation to the embodiments, and it will be understood by those skilled in the art that the embodiments are not intended to limit the disclosure of the present application to the disclosed content thereof.

On the other hand, the disclosure of the present application is intended to contain the spirit of the disclosure of the present application, and substitutes, modifications, and equivalents that can be included in the scope of the claims of the present application.

The description of the disclosure of the present application will be specifically given in detail so that the disclosure of the present application is sufficiently understandable.

However, as is clear to those skilled in the art, execution of the disclosure of the present application does not necessarily require all the matters that are specifically described in detail.

A known method, procedure, component, and circuit may be described not in detail so that an unnecessary difficulty in understanding the embodiments of the present disclosure can be prevented.

Note that all the terms and terms similar thereto should be related to an appropriate physical amount, and serve as simply-expedient labels attached to those amounts.

As is clear from the following discussion, the discussion using such terms as "receive", "receive/transmit", and "set" throughout the entire disclosure of the present application indicates an operation and a process of an electronic computing device, such as a computer system, unless otherwise noted.

The electronic computing device, such as a computer system, operates data that is expressed as a physical (electronic) amount in a register and a memory of the computer system, and converts the data to data that is expressed as a physical amount in the memory or register of the computer system, an information storage, a transmission device, or a display device.

Also, the disclosure of the present application is suitable for use of another computer system, such as an optical or mechanical computer.

Information Service Providing System 1

Hereinafter, a description will be given about an information service providing system 1 to which matters disclosed in the present application are applied.

Figure 1:
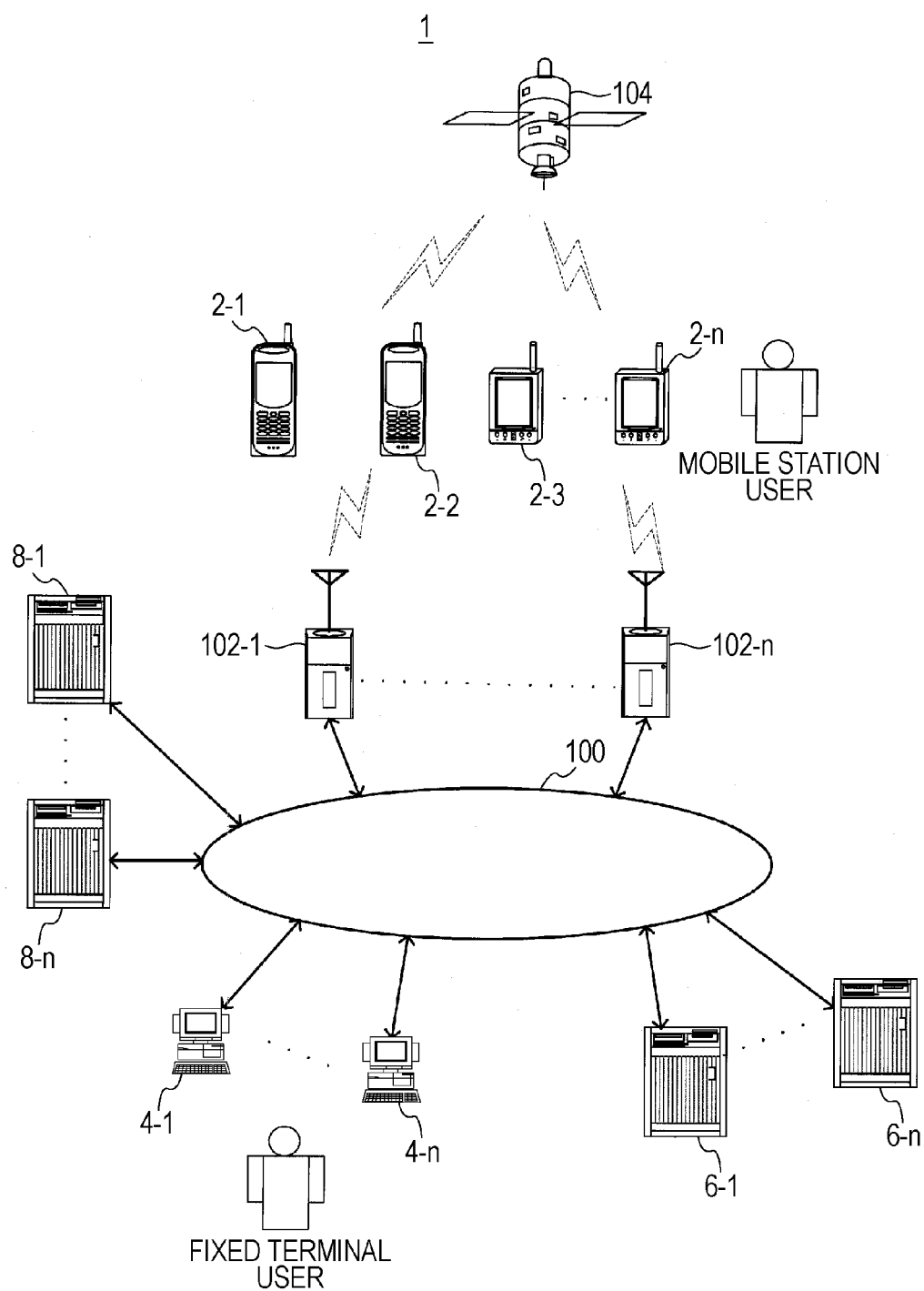
FIG. 1 illustrates a configuration of an information service providing system to which matters disclosed in the present application are applied.

FIG. 1 illustrates a configuration of the information service providing system 1 to which the matters disclosed in the present application are applied.

The information service providing system 1 includes mobile stations 2-1 to 2-n, fixed terminals 4-1 to 4-n, base stations 102-1 to 102-n, module/parameter server apparatuses 6-1 to 6-n, and Web servers 8-1 to 8-n, which are mutually connected via a network 100 compatible with both wired and wireless communications.

The mobile stations 2-1 to 2-n can receive radio signals for detecting positions from a GPS artificial satellite 104 in a site suitable for receiving radio waves, such as outdoors.

In the information service providing system 1, the mobile stations 2-1 to 2-n are apparatuses, such as a mobile phone, a PDA (Personal Digital Assistant) capable of performing wireless communication, a digital camera, and a portable personal computer, for example.

The fixed terminals 4-1 to 4-n are desktop computers, for example.

The base stations 102-1 to 102-n perform wireless data transmission between the fixed terminals 4-1 to 4-n and the mobile stations 2-1 to 2-n.

The Web servers 8-1 to 8-n transmit Web data in response to requests from the mobile stations 2 and the fixed terminals 4.

The mobile stations 2-1 to 2-n can receive radio signals for detecting positions from the GPS artificial satellite 104 in a site suitable for receiving radio waves, such as outdoors.

Note that "n" is an integer of 1 or more, whereas "i" and "j" are integers that satisfy $1 \leq i,j \leq n$. These symbols "i", "j", and "n" do not always represent the same number.

In the following description, any one or more of a plurality of components, such as the mobile stations 2-1 to 2-n, may be simply referred to as the mobile station(s) 2 when they are not specified.

Also, the components that can be entities of information communication and information processing, such as the base stations 102, the mobile stations 2, the fixed terminals 4, and the module/parameter server apparatuses 6, may be collectively referred to as nodes.

In the following description, the components and steps that are substantially the same in the respective figures are denoted by the same reference numerals unless otherwise noted.

The information service providing system 1 including the above-described components realizes information processing by nodes and information communication between nodes, and also functions as the above-described hybrid sensing system.

Hardware Configuration

Hereinafter, a hardware configuration of each node of the information service providing system 1 will be described.

Figure 2:
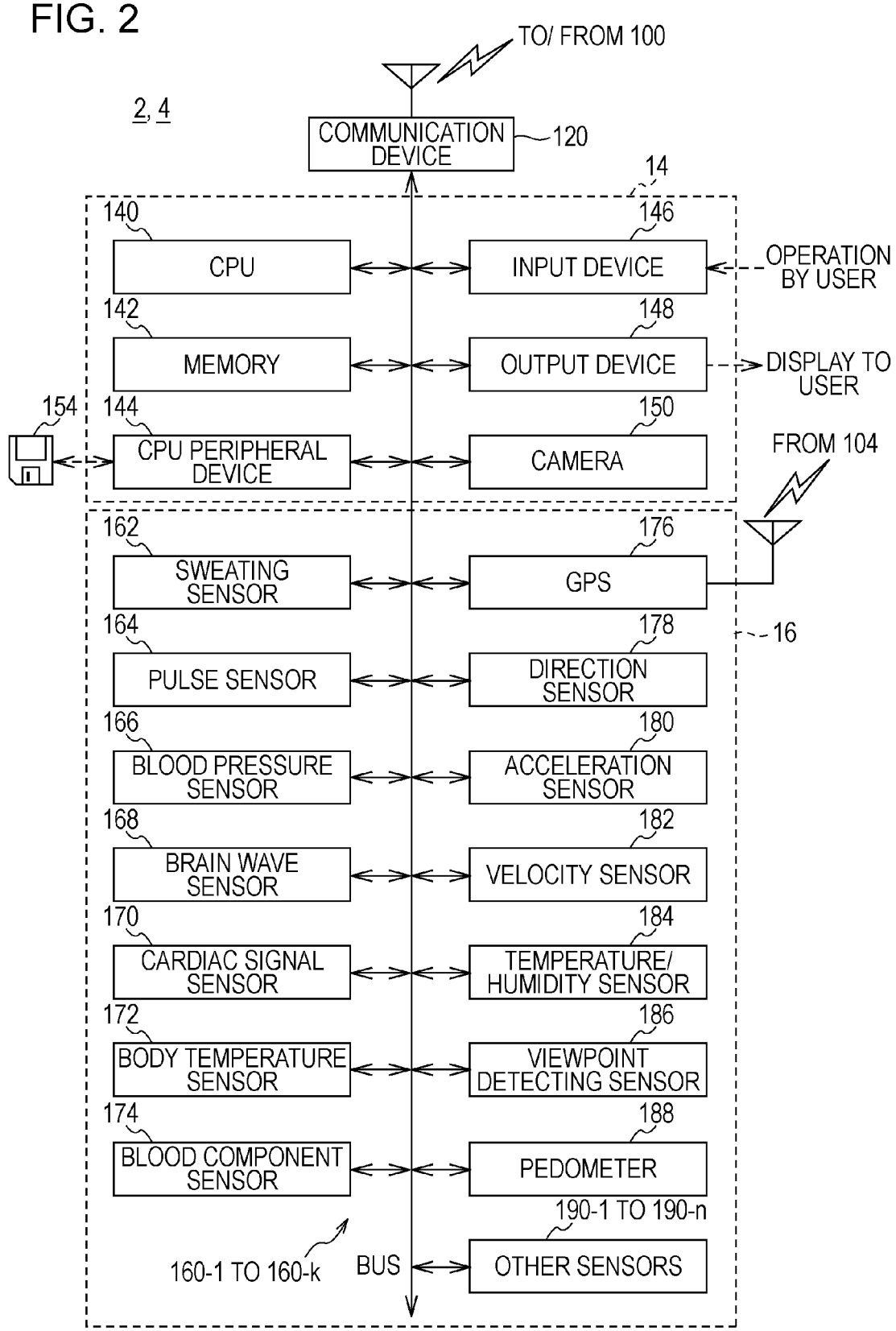
FIG. 2 illustrates a hardware configuration of each of mobile stations and fixed terminals illustrated in FIG. 1.

FIG. 2 illustrates a hardware configuration of each of the mobile stations 2 and the fixed terminals 4 illustrated in FIG. 1.

As illustrated in FIG. 2, each of the mobile stations 2 and the fixed terminals 4 includes a communication device 120 connected to the network 100 via a wireless or wired communication line, a data processing unit 14, and a sensor unit 16, which are mutually connected via a bus.

The data processing unit 14 includes a CPU (Central Processing Unit) 140, a memory 142, a CPU peripheral device 144, such as an interrupt control device, a timer device, and a recording medium interface that reads/writes data from/on a recording medium 154, an input device 146, such as input buttons including a numerical keypad and a microphone, an output device 148, such as a liquid crystal display device and a speaker, and a camera 150 that is capable of capturing moving and still images and that outputs captured images as digital image data.

The sensor unit 16 includes, for example, a sweating sensor 162, a pulse sensor 164, a blood pressure sensor 166, a brain wave sensor 168, a cardiac signal sensor 170, a body temperature sensor 172, a blood component sensor 174, a GPS 176, a direction sensor 178, an acceleration sensor 180, a velocity sensor 182, a temperature/humidity sensor 184, a viewpoint detecting sensor 186, a pedometer 188, and other sensors 190-1 to 190-n, such as sensors for using an RF-ID sensor or the like (hereinafter, these sensors are collectively referred to as sensors 160-1 to 160-k ("k" is the number of sensors included in the sensor unit 16).

That is, each of the mobile stations 2 and the fixed terminals 4 has components of a general computer that is capable of detecting information by sensors and performing information processing and information communication.

In the specific example illustrated FIG. 2, the sensor unit 16 includes a plurality of types of sensors 160, one for each type. Alternatively, the sensor unit 16 may include a plurality of types of sensors 160, plural for each type.

Each of the sensors included in the sensor unit 16 is driven and controlled by a compatible device driver program, detects information in accordance with the type of the sensor, and outputs the information as sensor information.

In the sensor unit 16, the sweating sensor 162 detects the amount of sweating of a user of the mobile station 2 or the fixed terminal 4 (a mobile station user or a fixed terminal user).

The pulse sensor 164 detects pulses of a user of the mobile station 2 or the like.

The blood pressure sensor 166 detects a blood pressure of a user of the mobile station 2 or the like.

The brain wave sensor 168 detects brain waves of a user of the mobile station 2 or the like.

The cardiac signal sensor 170 detects electric signals generated by the heart of a user of the mobile station 2 or the like.

The body temperature sensor 172 detects a body temperature of a user of the mobile station 2 or the like.

The blood component sensor 174 detects blood components, such as a blood glucose level, a neutral fat level, and a uric acid level in blood.

The GPS 176 detects the position (latitude and longitude) of the mobile station 2 or the like by using radio signals from the GPS artificial satellite 104 (FIG. 1).

The direction sensor 178 detects a movement direction of the mobile station 2 or the like by using a compass, a gyro, and the like.

The acceleration sensor 180 detects acceleration applied to the mobile station 2 or the like.

The velocity sensor 182 detects a movement velocity of the mobile station 2 or the like.

The temperature/humidity sensor 184 detects outdoor temperature/humidity.

The viewpoint detecting sensor 186 shoots the face of a user of the mobile station 2 or the like and detects the viewpoint of the user.

The pedometer 188 detects the number of steps of a user of the mobile station 2 or the like.

Figure 3:
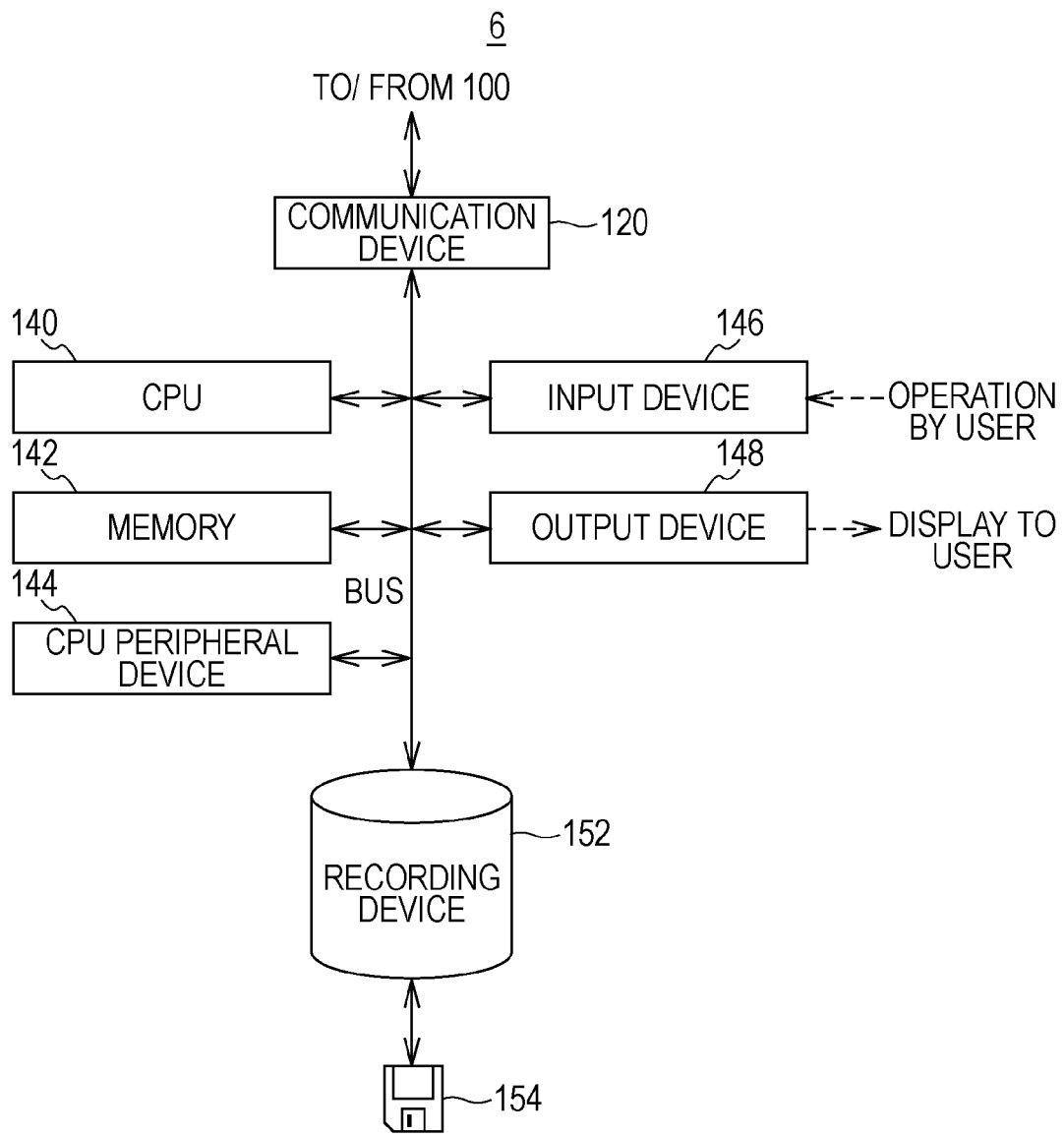
FIG. 3 illustrates a hardware configuration of each of server apparatuses illustrated in FIG. 1.

FIG. 3 illustrates a hardware configuration of each of the module/parameter server apparatuses 6 illustrated in FIG. 1.

As illustrated in FIG. 3, each of the module/parameter server apparatuses 6 includes a communication device 120, a CPU 140, a memory 142, a CPU peripheral device 144, an input device 146, an output device 148, and a recording device 152, such as an HDD (Hard Disk Drive) or a CD (Compact Disc) device.

That is, the module/parameter server apparatus 6 has components of a general computer that is capable of performing information processing and information communication.

Software

Hereinafter, software (program) executed in each node of the information service providing system 1 will be described.

Terminal Program 20

First, a terminal program 20 executed in the mobile station 2 and the fixed terminal 4 will be described.

Figure 4:
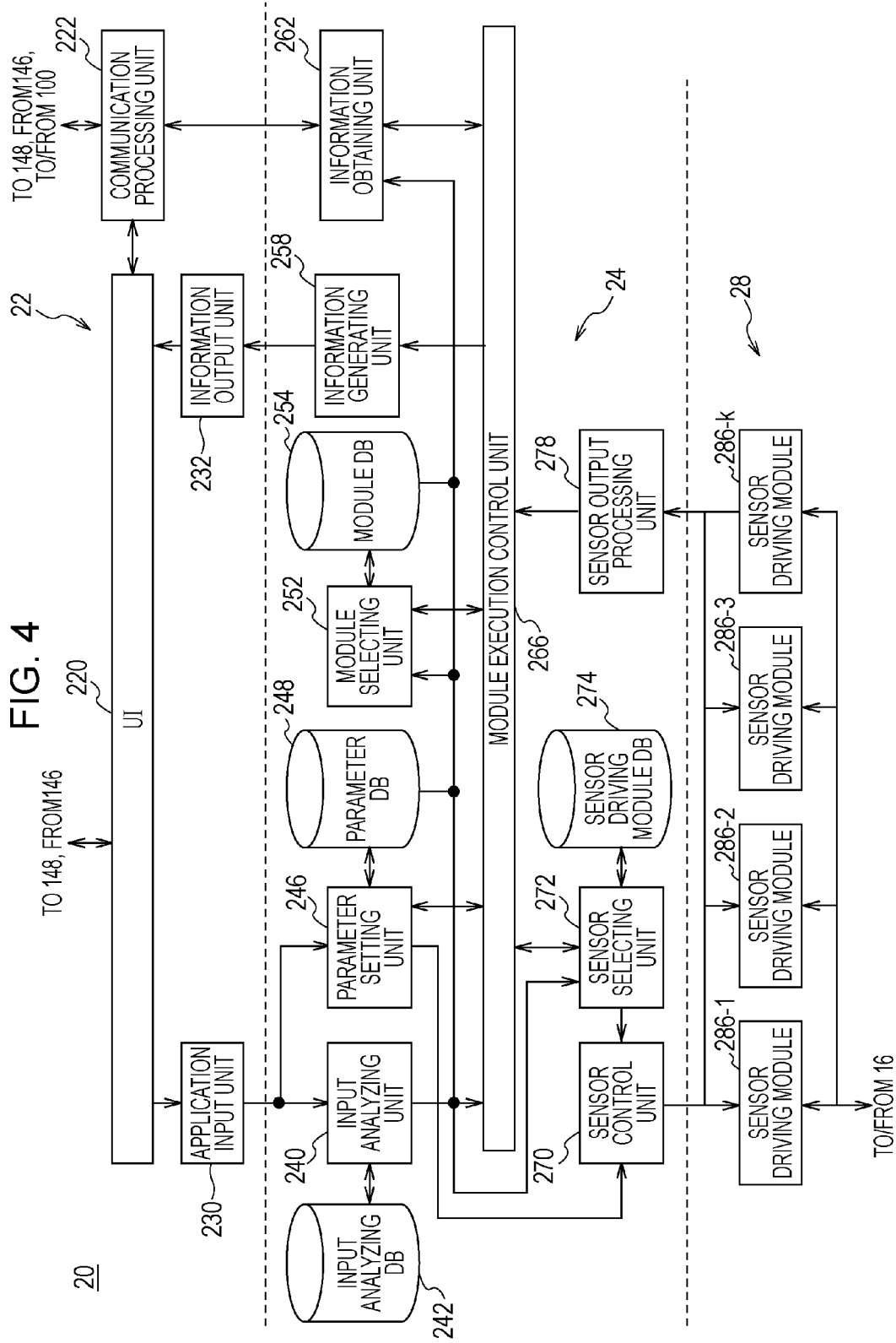
FIG. 4 illustrates a terminal program executed in each of the mobile stations and fixed terminals illustrated in FIGS. 1 and 2.

FIG. 4 illustrates the terminal program 20 executed in the mobile station 2 and the fixed terminal 4 illustrated in FIGS. 1 and 2.

As illustrated in FIG. 4, the terminal program 20 includes a service providing unit 22, a middleware 24, and a sensor driving unit 28.

The service providing unit 22 includes a user interface unit (UI) 220, a communication processing unit 222, an application input unit 230, and an information output unit 232.

The middleware 24 includes an input analyzing unit 240, an input analyzing database (DB) 242, a parameter setting unit 246, a parameter DB 248, a module selecting unit 252, a module DB 254, an information generating unit 258, an information obtaining unit 262, a module execution control unit 266, a sensor control unit 270, a sensor selecting unit 272, a sensor driving module DB 274, and a sensor output processing unit 278.

The sensor driving unit 28 includes sensor driving modules 286-1 to 286-k.

The terminal program 20 is loaded to the memory 142 of the mobile station 2 and the fixed terminal 4 via the recording medium 154 (FIGS. 2 and 3) and the network 100 or the like, and is executed on an OS (Operating System, not illustrated), which is executed in the mobile station 2 and the fixed terminal 4, with a specific use of hardware resources of the mobile station 2 and the fixed terminal 4 (this is the same in the following programs and modules).

The terminal program 20 having the above-described components receives specification of an information service desired by a user, selects one or more of the sensors 160, one or more of the sensor driving modules 286, one or more of service executing modules 300, and one or more of information generating modules 310 (described below with reference to FIG. 5) necessary to realize the specified information service, and realizes the specified information service by using these modules together.

In a case where a plurality of information services are specified, the terminal program 20 simultaneously realizes the plurality of information services in parallel.

Service Providing Unit 22

In the service providing unit 22 of the terminal program 20, the UI 220 displays a GUI (Graphical User Interface) image (not illustrated) that induces a user to select one or more information services on the display device of the output device 148, for example.

Also, the UI 220 receives, from the input device 146, a user operation of specifying one or more desired information services in accordance with the displayed GUI image, and outputs information specifying the specified information service(s) to the application input unit 230.

Also, the UI 220 outputs voice signals input from the microphone of the input device 146 to the communication processing unit 222, and outputs voice signals input from the communication processing unit 222 to the speaker of the output device 148.

The communication processing unit 222 performs a process for voice communication and general information communication in the mobile station 2 and the fixed terminal 4, and also performs a process for information communication with the module/parameter server apparatus 6 via the network 100.

The application input unit 230 receives information specifying the information service(s) input from the UI 220 and outputs the information to the middleware 24.

The information output unit 232 receives a result of the specified information service(s) from the middleware 24 and outputs the result via the UI 220 in the form predetermined for each specified service, such as in the form of image or voice.

Sensor Driving Modules, Service Executing Modules, and Information Generating Modules In order to help understanding of the middleware 24, the sensor driving modules 286, the service executing modules 300, and the information generating modules 310 (these modules are collectively referred to as modules) will be described before describing the middleware 24.

Figure 5:
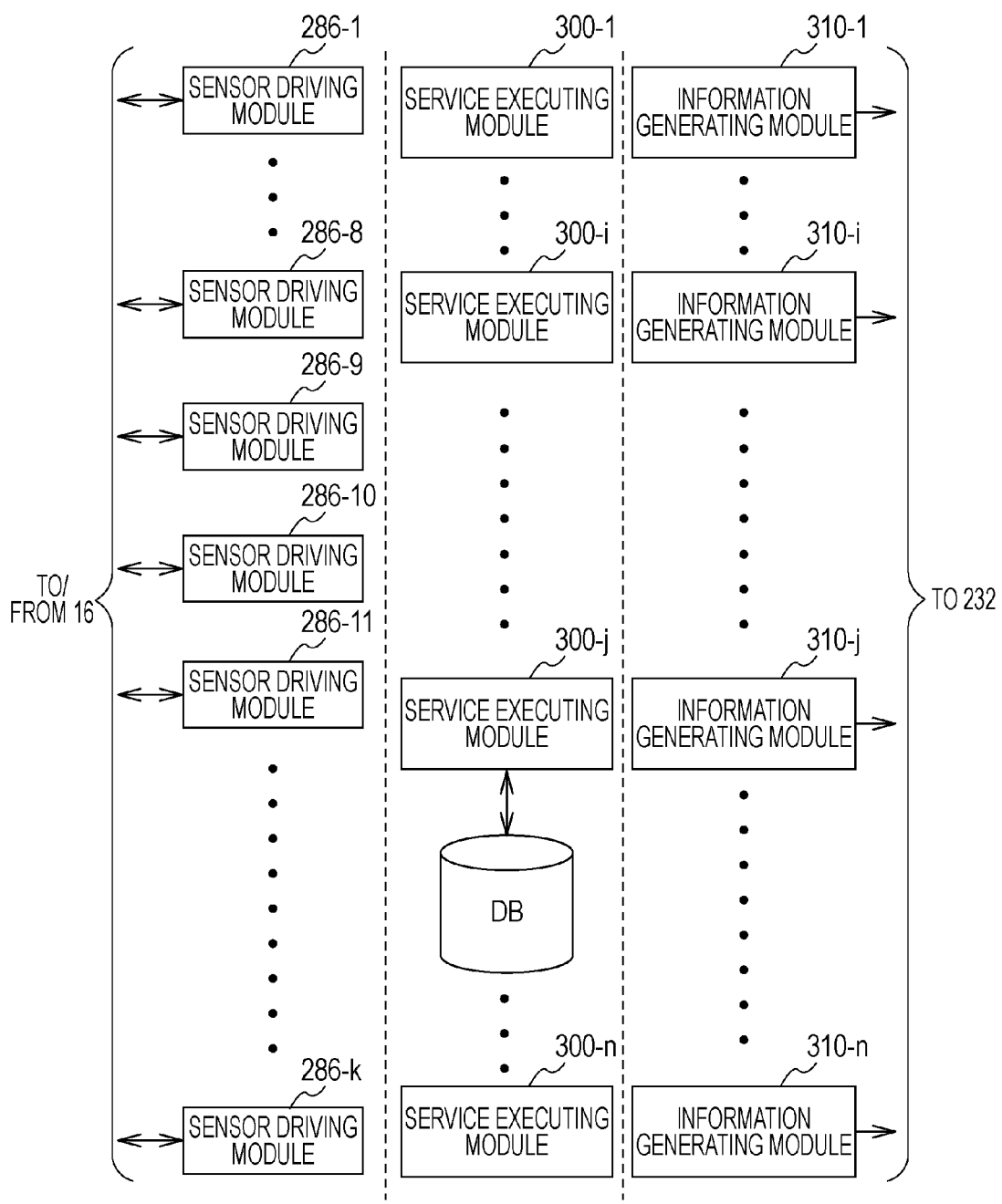
FIG. 5 illustrates sensor driving modules, service executing modules, and information generating modules executed by the terminal program illustrated in FIG. 4.

FIG. 5 illustrates the sensor driving modules 286, the service executing modules 300, and the information generating modules 310 that are executed by the terminal program 20 illustrated in FIG. 4.

These modules are executed in accordance with control by the middleware 24.

The sensor driving modules 286-1 to 286-k correspond to the sensors 160-1 to 160-k, respectively, and are compatible with the corresponding sensors 160.

That is, one or more sensor driving modules 286 corresponding to one or more sensors 160 selected to realize an information service specified by a user receive setting of sensor parameters P (described below with reference to FIG. 8) for optimally operating the corresponding sensors 160, and operates the corresponding sensors 160 by using the set sensor parameters P.

Furthermore, the sensor driving modules 286 generate sensor information indicating the temperature, the position (latitude and longitude), and the like detected by the corresponding sensors 160, and output the sensor information to one or more service executing modules 300 selected to realize the information service specified by the user.

The selected service executing modules 300 receive setting of service execution parameters P' (described below with reference to FIG. 7) for optimally executing a selected process.

Also, the service executing modules 300 receive sensor information from the sensor driving modules 286 corresponding to one or more selected sensors 160 and process the received sensor information by using the set service execution parameters P', thereby executing the specified information service.

The selected service executing modules 300 output a process result of the information service to one or more information generating modules 310 selected to realize the information service specified by the user.

The selected information generating modules 310 receive setting of information generation parameters P' for optimally executing the selected process (e.g., an output form of a result of an information processing service).

Also, the information generating modules 310 receive a process result from the one or more selected service executing modules 300 and processes the received sensor process result by using the set information generation parameters P', thereby generating a result of an information processing service according to a form predetermined for each information processing service (voice, image, or image format) and outputting the result to the information output unit 232 of the service providing unit 22.

Middleware 24 and Sensor Driving Unit 28

FIG. 6 is a first diagram illustrating a first service definition table stored in the input analyzing DB 242 illustrated in FIG. 4.

In the middleware 24, the input analyzing DB 242 stores the service definition table illustrated in FIG. 6 such that the input analyzing unit 240 can refer to the table.

The input analyzing unit 240 refers to the service definition table stored in the input analyzing DB 242 and notifies the module execution control unit 266, the module selecting unit 252, the information obtaining unit 262, and the sensor selecting unit 272 of one or more modules corresponding to one or more specified information services.

The information obtaining unit 262 refers to the parameter DB 248 and the module DB 254 and determines whether there exist modules, sensor parameters P, service execution parameters P', and information generation parameters P" (those are collectively called modules and parameters) necessary to realize an information service determined to be realizable by the module execution control unit 266 among the specified information services in the notification from the input analyzing unit 240.

In a case where any one or more of the modules and parameters necessary to realize the specified information service do not exist, the information obtaining unit 262 requests one or more of the modules and parameters not existing in the mobile station 2 and the fixed terminal 4 to the module/parameter server apparatus 6 (FIG. 1) via the network 100.

The information obtaining unit 262 allows the module DB 254 to store one or more modules transmitted from the module/parameter server apparatus 6 in accordance with the request and allows the parameter DB 248 to store one or more sensor parameters P, service execution parameters P', and information generation parameters P" (correctively referred to as parameters) transmitted from the module/parameter server apparatus 6.

Sets (MS#1 to MS#n) of one or more service executing modules 300 and one or more information generating modules 310 used in respective information services include information defining the sensors 160 (sensor driving modules 286) from which the service executing modules 300 receive sensor information.

Also, the sets (MS#1 to MS#n) include information defining which information is input/output between one of the service executing modules 300 and another and defining which service executing module 300 outputs a process result to which information generating module 310.

Also, the sets (MS#1 to MS#n) indicate information defining which information is input/output between one of the information generating modules 310 and another and defining which information generating module 310 outputs a final result of an information service to the information generating unit 258.

The priorities of the sensors 160 indicate which sensors 160 (sensor driving modules 286) should be used in a case where a plurality of sensors 160 can be used in a specified information service.

FIG. 6 illustrates that, as described above, in a case where the mobile station 2 and the fixed terminal 4 provide a navigation service as an information service, the service executing module 300 should process sensor information (latitude and longitude) of the GPS 176 (FIG. 2) when the GPS 176 is capable of receiving radio signals from the GPS artificial satellite 104 (FIG. 1) whereas the service executing module 300 should calculate position information in an integrating process using sensor information output from the direction sensor 178, the acceleration sensor 180, and the velocity sensor 182 when the GPS 176 is incapable of receiving radio signals.

The priorities of information services are represented by values of 1, 2, 3, . . . , like the priorities of the sensors 160. As the value is smaller, the priority is higher.

The priorities of the information services indicate which information service should be preferentially executed, for example, in a case where a plurality of information services are specified and where not all of the information services can be executed because the plurality of information services require the same resources or due to the limit of the processing ability of the data processing unit 14 (FIG. 2) of the mobile station 2 and the fixed terminal 4.

That is, for example, in a case where not all of the plurality of information services using the same sensors 160 can be executed, a high-priority information service is preferentially executed.

Also, in a case where not all of the plurality of information services can be executed due to the limit of the processing ability of the data processing unit 14, the information services are executed in a descending order of priority, and a low-priority information service whose execution causes the processing ability of the data processing unit 14 to reach the limit is not executed.

In addition, the priorities of the information services indicate which set of sensors 160 should be preferentially executed, for example, in a case where an information service is specified and where a sensor capable of providing sensor data necessary to enhance accuracy, response speed, and details of the information service is unusable.

For example, the priorities of the information services indicate that, in a case where only one blood pressure sensor 166 and one pulse sensor 164 are usable under the condition that the best result can be obtained when one blood pressure sensor 166, one pulse sensor 164, and two brain wave sensors 168 are usable in a health check service, the health check service can be executed by using those two sensors 160.

FIG. 7 is a first diagram illustrating a service execution parameter table stored in the parameter DB 248 illustrated in FIG. 4.

FIG. 8 is a first diagram illustrating a sensor parameter table stored in the parameter DB 248 illustrated in FIG. 4.

The parameter DB 248 stores the service execution parameter table illustrated in FIG. 7, the sensor parameter table illustrated in FIG. 8, and an information generation parameter table having the same configuration as that of the service execution parameter table illustrated in FIG. 7 such that the parameter setting unit 246 and the information obtaining unit 262 can refer to those tables.

The parameter setting unit 246 refers to the sensor parameter table, the service execution parameter table, and the information generation parameter table stored in the parameter DB 248, and outputs, to the sensor control unit 270, the sensor parameters P of the sensors 160 (sensor driving modules 286) necessary to realize an information service determined to be realizable by the module execution control unit 266 among specified services.

Also, the parameter setting unit 246 outputs, to the module execution control unit 266, service execution parameters P' and information generation parameters P" of the service executing modules 300 and the information generating modules 310 necessary to realize the specified service.

Hereinafter, the roles of the service definition table and the sensor parameter table illustrated in FIGS. 6 and 8 will be described.

In order to realize the above-described hybrid sensing system, the service definition table and the sensor parameter table are used to describe set patterns of the sensors 160 of different types according to purposes of users.

First, the service definition table (FIG. 6) will be described.

In the service definition table, the correspondence between the context to be extracted and sets of the sensors 160 is set.

The values set in the service definition table indicate the number of sensors to be used. A value 0 indicates that the sensor 160 with this value is not used.

Also, a plurality of different information services can be described in the service definition table.

In the service definition table (FIG. 6), priorities corresponding to sets of the sensors 160 are set to the same information services.

The priorities are represented by values 0, 1, 2, 3, . . . , for example, and a set of sensors 160 to which a small value is set is preferentially used.

The priorities of the sensors 160 corresponding to the information services indicate, for example, which set of sensors 160 should be preferentially used according to cases when all the sensors 160 necessary to enhance accuracy, response speed, details, etc. of an information service can be used and when only part of the sensors 160 can be used in a case where the information service is specified.

In an information service that provides health information, assume a specific example where the best result can be obtained when three high-accuracy brain wave sensors 168, one high-accuracy blood pressure sensor 166, one high-accuracy pulse sensor 164, and one high-accuracy body temperature sensor 172 are used. Then, the set of those sensors 160 is set in the service definition table together with priority.

However, it is assumed that the sensors 160 included in the set for obtaining the above-described best result are unusable due to the configuration (environment) of the mobile station 2.

In such a case, one high-accuracy brain wave sensor 168, one middle-accuracy pulse sensor 164, and one low-accuracy body temperature sensor 172 are set as a set of sensors 160 for obtaining the second best result in the service definition table together with priority.

In this way, by setting a plurality of sets of sensors 160 for the same information service, an information service desired by a user of the mobile station 2 can be realized by using the set of sensors 160 for obtaining the second best result even when the set of sensors 160 for obtaining the best result is unusable in the mobile station 2.

Next, the sensor parameter table (FIG. 8) will be described.

In order to realize the above-described hybrid sensing system, a sensor parameter table is set for each sensor 160 so that a selected sensor 160 optimally operates.

In the sensor parameter table, sensor parameters according to context to be extracted are set by values.

For example, in a case where a video camera is used as the sensor 160, a measurement interval S (seconds) and an analyzing resolution p of an image are set as sensor parameters in the parameter table.

In the hybrid sensing system, a set of sensors usable in each mobile station 2 is adaptively selected in accordance with a situation with reference to the service definition table and the sensor parameter table, and parameters indicating an optimal operation are set to respective selected sensors 160, whereby sensor data for realizing an information service can be obtained.

A procedure for realizing the hybrid sensing system will be described below.

Step 1-1: A user of the mobile station 2 specifies an information service.

Step 1-2: The service definition table is referred and a set of sensors 160 having a priority "n" (the initial value of "n"=1) is selected in the specified information service.

Step 1-3: It is determined whether all the sensors 160 included in the set selected in step 1-2 are usable, and if only part of the set is usable, step 1-2 is performed again and a set of sensors 160 having a priority (n+1) is selected.

Step 1-4: Sensor parameters that enable an optimal operation of the respective sensors 160 selected in step 1-3 are obtained with reference to the sensor parameter table.

Step 1-5: The sensor parameters obtained in step 1-4 are set to the corresponding sensors 160.

For example, assume a case where the first highest priority is put on a set including one blood pressure sensor 166, one pulse sensor 164, and one body temperature sensor 172, and the second highest priority is put on a set including one pulse sensor 164 and one body temperature sensor 172 in the service definition table in a health information service.

In this case, if only the set including one pulse sensor 164 and one body temperature sensor 172 is usable in one of the mobile stations 2, the set of the second highest priority including one pulse sensor 164 and one body temperature sensor 172 is selected in the hybrid sensing system. Furthermore, sensor parameters that correspond to the pulse sensor 164 and the body temperature sensor 172 and that are obtained with reference to the sensor parameter table are set to the pulse sensor 164 and the body temperature sensor 172, respectively.

Furthermore, in the hybrid sensing system, sensor data obtained from the respective sensors 160 is processed in the following procedure, whereby an information service specified by a user of the mobile station 2 is provided.

Step 2-1: Sensor data necessary to realize a function for providing an information service is received from the sensors 160.

Step 2-2: A process necessary to realize the function for providing the information service is performed with use of the sensor data received in step 2-1.

Step 2-3: On the basis of a result of the process performed in step 2-2, information obtained as a result of the information service specified by the user (voice, character, image, movie, etc.) is presented to the user via the display device and speaker of the mobile station 2 or a large-screen monitor in a commercial space.

Hereinafter, the configurations of the sensor parameter table, the service execution parameter table, and the information generation parameter table will be further described.

As illustrated in FIG. 8, the sensor parameter table stores the correspondence between information services ("services") that can be provided by the mobile station 2 and the fixed terminal 4 and sensor parameters P ("parameters for sensors") that are set to the sensors 160 (sensor driving modules 286) in the respective information services and that are used to operate the sensors.

The sensor parameters P are, for example, used to adjust the sensitivities etc. of the sweating sensor 164, the blood pressure sensor 166, and the body temperature sensor 172 when a health check is provided as an information service as described above.

When a plurality of parameters are set to one sensor 160, the sensor parameters P are used to adjust a plurality of settings to the sensor 160.

For example, when sensitivity, a measurement time, a measurement interval, and the like are set to the blood pressure sensor 166, the sensor parameter P of the blood pressure sensor 166 includes a plurality of parameters used to adjust the settings thereof.

As illustrated in FIG. 7, the service execution parameter table stores the correspondence between information services that can be provided by the mobile station 2 and the fixed terminal 4 and service execution parameters P' used for a process in the service executing modules 300 used to realize the respective information services.

For example, the service execution parameters P' indicate a normal body temperature, normal pulses, and the like of the user of the mobile station 2 and the fixed terminal 4 when a health check is provided as an information service as described above.

On the other hand, when a navigation service is provided as an information service, the service execution parameters P' include constants for generating position information through an integrating process in the direction sensor 178 and the acceleration sensor 180 by the service executing modules 300, and also include map information that is displayed while being associated with the position information.

The information generation parameter table, like the service execution parameter table illustrated in FIG. 7, stores the correspondence between information services ("services") that can be provided by the mobile station 2 and the fixed terminal 4 and information generation parameters P' ("parameters for modules") that are used for a process in the information generating modules 310 used to realize the respective information services.

The information generation parameters P' indicate an image format for displaying an information service on the output device 148, for example.

The module DB 254 stores the service executing modules 300 and the information generating modules 310 (FIG. 5) used for information services that can be provided by the mobile station 2 and the fixed terminal 4 such that the module selecting unit 252 and the information obtaining unit 262 can access the modules.

The module selecting unit 252 selects and reads one or more service executing module 300 and one or more information generating module 310 used for an information service that is determined to be realizable by the module execution control unit 266 among specified information services in accordance with the information supplied from the input analyzing unit 240, and loads the selected modules to the module execution control unit 266.

The sensor driving module DB 274 stores the sensor driving modules 286 compatible with the sensors 160 used for information services that can be provided by the mobile station 2 and the fixed terminal 4 such that the sensor selecting unit 272 can access the modules.

The sensor selecting unit 272 selects and reads the sensor driving modules 286 used for an information service that is determined to be realizable by the module execution control unit 266 among specified information services in accordance with the information supplied from the input analyzing unit 240, and outputs the selected modules to the sensor control unit 270.

Also, the sensor selecting unit 272 determines whether a set of the sensors 160 necessary to obtain sensor data for enhancing accuracy, response speed, and details, etc. of the specified information service is usable, and notifies the parameter setting unit 246 of the set of the sensors 160 determined to be usable.

For example, in a case where the best result can be obtained when one blood pressure sensor 166, one pulse sensor 164, and two brain wave sensors 168 can be used in a health check service and where only one blood pressure sensor 166 and one pulse sensor 164 are usable respectively although not all of the sensors are usable, the sensor selecting unit 272 determines that the set of those two sensors is usable and notifies the parameter setting unit 246.

The sensor control unit 270 sets the sensor parameters P set by the parameter setting unit 246 to the sensor driving modules 286 input from the sensor selecting unit 272 and executes the sensor driving modules 286, thereby operating the sensors 160.

The sensors 160 are operated by the sensor driving modules 286, detect information according to the respective types, and transmit detection results to the sensor driving modules 286.

The sensor control unit 270 outputs the detection results input from the sensors 160 to the sensor output processing unit 278, as sensor information.

The sensor output processing unit 278 loads the sensor information input from the sensor driving modules 286 to the module execution control unit 266.

The module execution control unit 266 processes the notification from the input analyzing unit 240. If another information service has already been being executed, the module execution control unit 266 determines whether the resources necessary to realize a newly-specified information service and the information service that has already been being executed overlap, and estimates the amount of process necessary for each of the information services.

The module execution control unit 266 determines which information service can be realized on the basis of overlap in resources between the newly-specified information service and the information service that has already been being executed, a processing ability necessary to realize each of the information services, and a residual processing ability of the mobile station 2 and the fixed terminal 4 obtained from the OS operating on the mobile station 2 and the fixed terminal 4. Then, the module execution control unit 266 notifies the parameter setting unit 246, the module selecting unit 252, and the sensor selecting unit 272 of the information service determined to be executable.

The module execution control unit 266 performs setting so that the sensors 160 (sensor driving modules 286), and the service executing modules 300 and the information generating modules 310 loaded from the module selecting unit 252 to realize a realizable information service among the specified services perform input/output in accordance with information indicating the input/output relationship input from the input analyzing unit 240.

Also, the module execution control unit 266 sets the service execution parameters P' and the information generation parameters P' input from the parameter setting unit 246 to the loaded service executing modules 300 and the information generating modules 310.

The module execution control unit 266 executes the service executing modules 300 and the information generating modules 310 to which the foregoing settings have been made, thereby realizing one or more information services.

Furthermore, the module execution control unit 266 outputs a result of the realized information service(s) to the information generating unit 258.

The information generating unit 258 generates information to be output to the user on the basis of the result of the information service(s) input from the module execution control unit 266 and outputs the information to the information output unit 232 of the service providing unit 22.

Server Program 60

Hereinafter, a server program 60 executed in each of the module/parameter server apparatuses 6 illustrated in FIG. 1 will be described.

Figure 9:
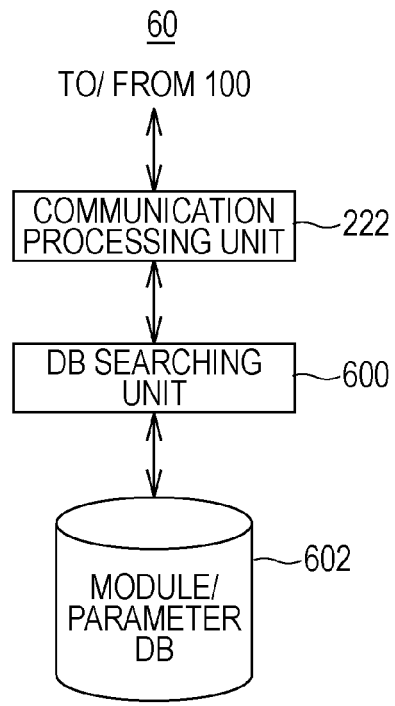
FIG. 9 illustrates a server program executed in each of the server apparatuses illustrated in FIG. 1.

FIG. 9 illustrates the server program 60 executed in each of the module/parameter server apparatuses 6 illustrated in FIG. 1.

As illustrated in FIG. 9, the server program 60 includes a communication processing unit 222, a DB searching unit 600, and a module/parameter DB 602.

The server program 60 including those components receives a request from the mobile station 2 and the fixed terminal 4 and transmits requested modules and parameters.

In the server program 60, the module/parameter DB 602 stores modules and parameters necessary for information services provided in the mobile station 2 and the fixed terminal 4 such that the DB searching unit 600 can refer to the modules and parameters.

The DB searching unit 600 reads one or more of the modules and parameters requested by the mobile station 2 and the fixed terminal 4 from the module/parameter DB 602 and transmits the read module(s) and parameter(s) to the mobile station 2 and the fixed terminal 4 via the communication processing unit 222 and the network 100.

Web Program 80

Hereinafter, a Web program 80 executed in each of the Web servers 8 illustrated in FIG. 1 will be described.

Figure 10:
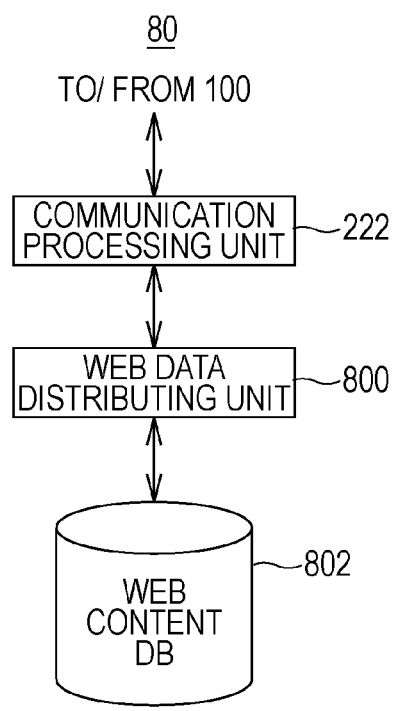
FIG. 10 illustrates a Web program executed in each of Web servers illustrated in FIG. 1.

FIG. 10 illustrates the Web program 80 executed in each of the Web servers 8 illustrated in FIG. 1.

As illustrated in FIG. 10, the Web program 80 includes a communication processing unit 222, a Web data distributing unit 800, and a Web content DB 802.

The Web program 80 including those components receives a request from the mobile station 2 and the fixed terminal 4 and transmits requested Web content.

In the Web program 80, the Web content DB 802 stores Web content that is provided to the mobile station 2 and the fixed terminal 4 and is displayed there such that the Web data distributing unit 800 can access the Web content.

The Web data distributing unit 800 reads Web content from the Web content DB 802 in response to a request from the mobile station 2 and the fixed terminal 4 and transmits the Web content to the mobile station 2 and the fixed terminal 4 via the service providing unit 22 and the network 100.

Operation of Information Service Providing System 1 According to First Embodiment Hereinafter, an operation of the information service providing system 1 according to the first embodiment will be described.

Figure 11A:
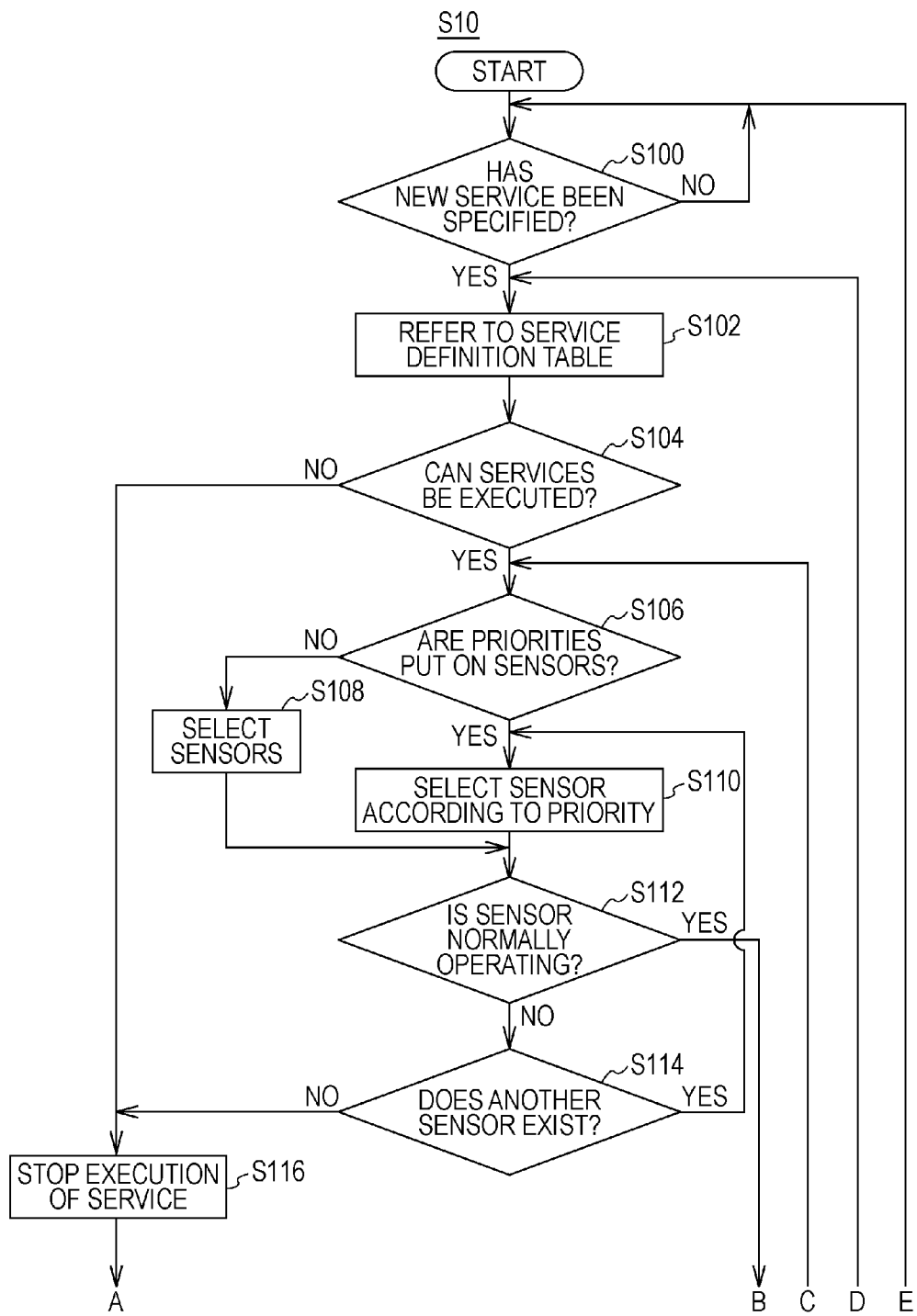
FIG. 11A is a first flowchart illustrating an operation according to a first embodiment of the information service providing system illustrated in FIG. 1.
Figure 11B:
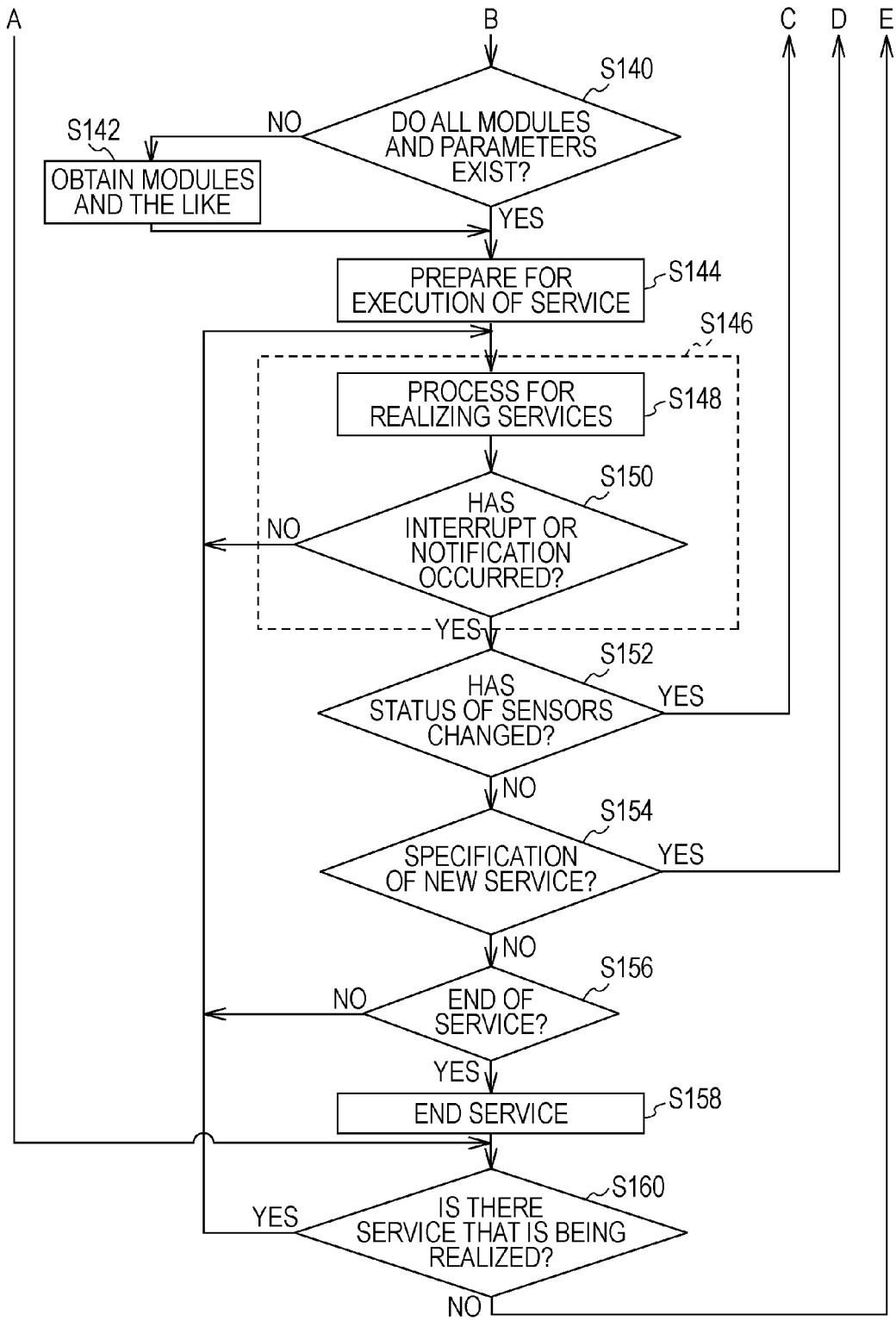
FIG. 11B is a second flowchart illustrating the operation according to the first embodiment of the information service providing system illustrated in FIG. 1.

FIGS. 11A and 11B are first and second flowcharts illustrating an operation S10 according to the first embodiment of the information service providing system 1 illustrated in FIG. 1.

The symbols A to E illustrated in FIGS. 11A and 11B indicate flows of a process, that is, the lines denoted by the same symbols in these figures are connected to each other.

As illustrated in FIGS. 11A and 11B, in step 100 (S100), when the terminal program 20 (FIG. 4) is started in the mobile station 2 and the fixed terminal 4 and when the server program 60 (FIG. 9) is started in the module/parameter server apparatus 6, the application input unit 230 of the terminal program 20 determines whether a user of the mobile station 2 and the fixed terminal 4 has performed an operation of specifying a new information service to the input device 146 (UI 220).

If the operation has been performed, the terminal program 20 proceeds to step 102 (S102). Otherwise, the terminal program 20 remains in S100.

In S102, the input analyzing unit 240 receives specification of an information service via the application input unit 230, refers to the service definition table (FIG. 6) stored in the input analyzing DB 242, determines which modules and parameters are necessary to realize the specified service, and notifies the module execution control unit 266 and the like of the modules and parameters.

Furthermore, the module execution control unit 266 processes the notification from the input analyzing unit 240. If another information service has already been being executed, the module execution control unit 266 determines whether resources necessary to realize the newly-specified information service and the information service that has already been being executed overlap.

Also, the module execution control unit 266 estimates the amount of process necessary for the newly-specified information service.

Also, the sensor selecting unit 272 determines whether a set of sensors 160 necessary to obtain sensor data for enhancing accuracy, response speed, and details, etc. of the specified information service can be used.

In step 104 (S104), the module execution control unit 266 determines whether each of the information services can be executed on the basis of the overlap in resources determined above, a residual processing ability of the mobile station 2 and the fixed terminal 4 obtained from the OS operating on the mobile station 2 and the fixed terminal 4, the estimated amount of process, and the priorities of the information services defined in the service definition table.

If there is an inexecutable information service, the terminal program 20 proceeds to step 116 (S116), where the module execution control unit 266 and the sensor control unit 270 perform a process to stop execution of the inexecutable information service. Otherwise, the terminal program 20 proceeds to step 106 (S106).

In S106, the sensor selecting unit 272 determines whether priorities are put on the sensors 160 necessary to realize the newly-specified information service in the service definition table (FIG. 6).

If priorities are put on the sensors 160, the terminal program 20 proceeds to step 110 (S110). Otherwise, the terminal program 20 proceeds to step 108 (S108).

In S108, the sensor selecting unit 272 selects the sensors 160 (sensor driving modules 286) necessary to realize the newly-specified information service in the service definition table (FIG. 6).

Also, the sensor selecting unit 272 determines whether a set of the sensors 160 necessary to obtain sensor data for obtaining the best accuracy, response speed, and details of the specified information service is usable.

If the set of the sensors 160 is unusable, the sensor selecting unit 272 determines whether a set of sensors 160 having the second highest priority is usable in the same information service.

In S110, the sensor selecting unit 272 selects the sensor 160 that has not yet been a target of the process in S110 at the time and that has the highest priority in the service definition table from among the usable sensors 160 necessary to realize the newly-specified information service.

In step 112 (S112), the sensor control unit 270 determines whether the sensor 160 selected in S110 is normally operating.

If the sensor 160 is normally operating (e.g., if the GPS 176 is normally receiving radio signals in a navigation service), the terminal program 20 proceeds to step 140 (S140). Otherwise, the terminal program 20 proceeds to step 114 (S114).

In S114, the sensor selecting unit 272 determines whether there is another sensor 160 that has not yet been a target of the process in S110 at the time among the sensors 160 necessary to realize the newly-specified information service.

If another sensor 160 exists, the terminal program 20 returns to S110. Otherwise, the terminal program 20 proceeds to S116, where the module execution control unit 266 and the sensor control unit 270 perform a process to stop the newly-specified information service.

In S140, the information obtaining unit 262 determines whether all the modules and parameters (FIGS. 5 to 7) necessary to realize the newly-specified information service exist in the terminal program 20.

If all the necessary modules and parameters exist in the terminal program 20, the terminal program 20 proceeds to step 144 (S144). Otherwise, the terminal program 20 proceeds to step 142 (S142).

In S144, the module execution control unit 266 sets the parameters input from the parameter DB 248 to the modules loaded from the module selecting unit 252, performs setting so that information is received/transmitted among the modules, the middleware 24, and the sensor driving unit 28 in a manner suitable for realizing the newly-specified information service, thereby preparing for execution of the information service.

In step 146 (S146), the module execution control unit 266 performs a process to realize each of the information services and outputs results of the information services via the information generating unit 258 and the UI 220 (S148).

During the process to realize the information services, the module execution control unit 266 determines in step 150 (S150) whether an interrupt signal or a notification from the OS has occurred. The interrupt signal or the notification indicates, for example, specification of a new information service, a notification indicting that the sensor 160 (sensor driving module 286) that had normally operated operates abnormally, or a notification indicating that the sensor 160 that had abnormally operated operates normally.

If an interrupt has occurred, the module execution control unit 266 proceeds to step 152 (S152). Otherwise, the module execution control unit 266 remains in S146.

In S152, the module execution control unit 266 determines whether a change has occurred in the status of the sensors 160 (sensor driving modules 286) that are operating to realize the respective information services.

That is, the module execution control unit 266 determines whether a phenomenon caused by a change in status of the sensors 160 has occurred. The change in status is, for example, that the sensor 160 (sensor driving module 286) that had normally operated to realize the respective information service operates abnormally, or that the sensor 160 that had abnormally operated operates normally.

If a phenomenon caused by a change in status of the sensors 160 used to realize an information service has occurred, the terminal program 20 returns to S106 under a state where the sensor 160 used to realize this information service is not a target of the process in S110. Otherwise, the terminal program 20 proceeds to step 154 (S154).

In S154, the module execution control unit 266 determines whether the occurrence of the interrupt or the like detected in S150 is specification of a new service.

If the occurrence of the interrupt or the like is specification of a new service, the terminal program 20 returns to S102. Otherwise, the terminal program 20 proceeds to step 156 (S156).

In S156, the module execution control unit 266 determines whether the occurrence of the interrupt or the like detected in S150 indicates end of an information service that is being executed.

If the occurrence of the interrupt or the like indicates end of an information service that is being executed, the terminal program 20 proceeds to step 158 (S158). Otherwise, a process for occurrence of the interrupt is appropriately performed and the terminal program 20 returns to S146.

In S158, the module execution control unit 266 performs a process of ending the information service determined to be ended in S156.

In step 160 (S160), the module execution control unit 266 determines whether there is an information service that is being realized other than the information service that is ended in S158.

If there is an information service that is being realized, the terminal program 20 returns to S146. Otherwise, the terminal program 20 returns to S100.

Examples of Information Services

Hereinafter, examples of first and second information services provided by the mobile station 2 and the fixed terminal 4 will be described.

FIGS. 6 to 8 illustrate the service definition table, the sensor parameter table, the service execution parameter table, and the information generation parameter table for realizing the following three examples.

The information services described below are only examples, and the information services that can be provided by the mobile station 2 and the fixed terminal 4 are not limited to these three examples.

Health Check

Hereinafter, an operation of the mobile station 2 and the fixed terminal 4 will be described with a specific example in which a first health check of checking the health condition of a user is provided by the mobile station 2 and the fixed terminal 4.

Figure 12:
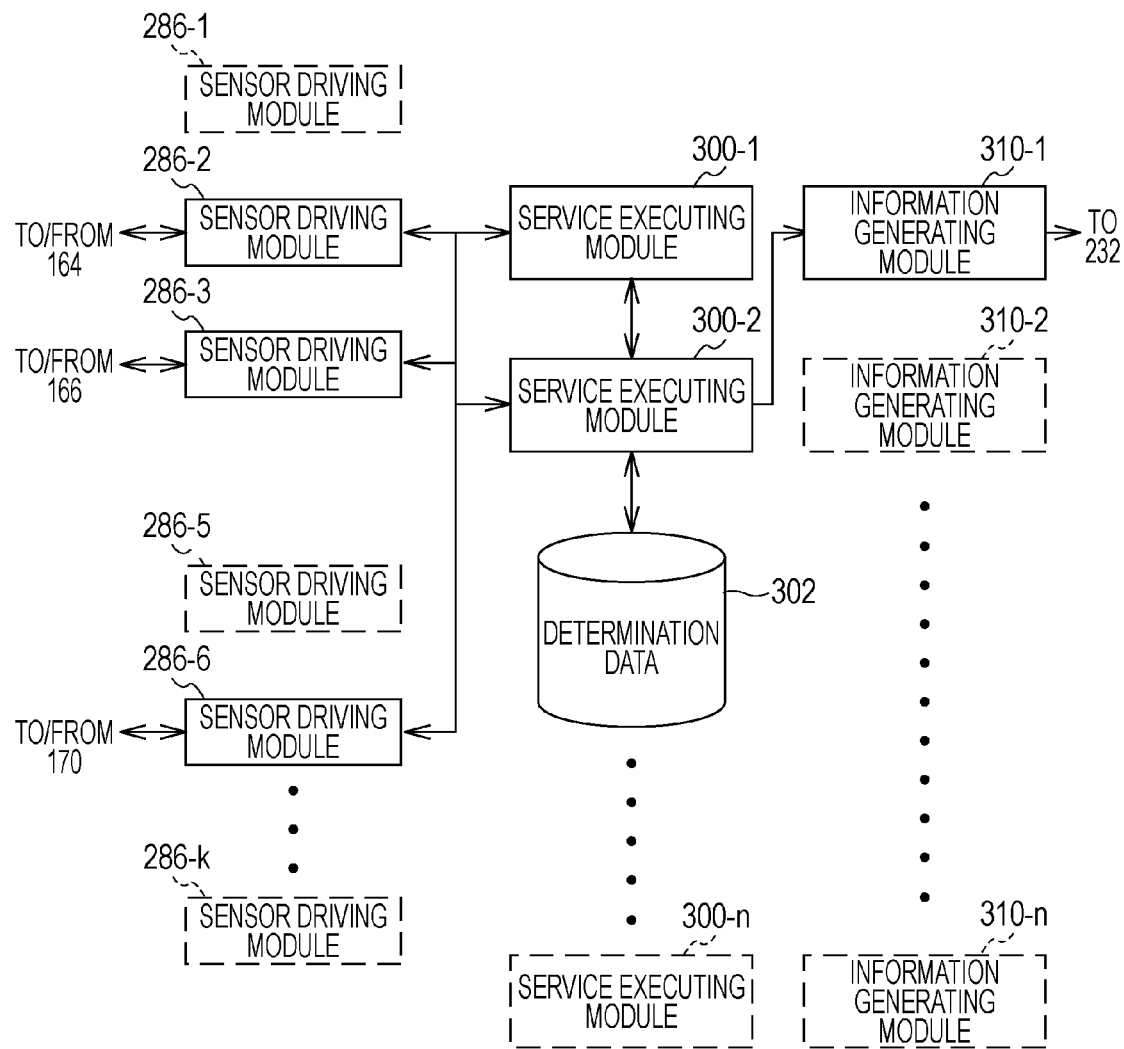
FIG. 12 illustrates a first information service (health check) provided by the mobile station and the fixed terminal illustrated in FIG. 1.

FIG. 12 illustrates the first information service (health check) provided by the mobile station 2 and the fixed terminal 4.

As illustrated in FIG. 12, in a case where the mobile station 2 and the fixed terminal 4 realize a health check as an information service, for example, the pulse sensor 164, the blood pressure sensor 166, and the body temperature sensor 172 are selected as the sensors 160, and the sensor driving modules 286-1, 286-2, and 286-5 compatible with those sensors are loaded to the sensor control unit 270 and are executed.

Also, for example, a service executing module 300-1 that periodically collects sensor information indicating body information, such as a pulse rate, a blood pressure, and a body temperature of the user from the sensors 160 and that generates a value generally indicating the sensor information is loaded to the module execution control unit 266.

Also, a service executing module 300-2 that compares the value generated by the service executing module 300-1 with determination data 302 set as a service execution parameter and that generally determines the health condition of the user of the mobile station 2 and the fixed terminal 4 is loaded to the module execution control unit 266.

Furthermore, an information generating module 310-1 that generates a health check result in a predetermined image format on the basis of the determination result supplied from the service executing module 300-2 is loaded to the module execution control unit 266.

The module execution control unit 266 allows the service executing module 300-1 to receive and process the sensor information supplied from the sensor driving modules 286-1, 286-2, and 286-5, and to output a process result to the service executing module 300-2.

The service executing module 300-2 determines the process result input from the service executing module 300-1 and outputs a determination result to the information generating module 310-1.

The information generating module 310-1 generates a health check result in a predetermined format on the basis of the determination result input from the service executing module 300-2 and outputs the health check result to the information output unit 232 via the information generating unit 258 (FIG. 4), thereby presenting the health check result to the user.

Alternatively, the information generating module 310-1 may display the body information obtained from the sensors 160 on the output device 148 together with the determination result.

Alternatively, a plurality of types of health check can be provided.

For example, for a health check with a focus on the motion of the heart of a user, the service definition table (FIG. 6) may be set so that the pulse sensor 164, the blood pressure sensor 166, the sweating sensor 162, the cardiac signal sensor 170, the body temperature sensor 172, the blood component sensor 174, and the temperature/humidity sensor 184 are used as the sensors 160, and parameters appropriate for this purpose may be set in the sensor parameter table, the service execution parameter table, and the information generation parameter table.

In this case, priorities are set to the respective sensors 160 to be used in the service definition table. For example, the highest priority 1 is set to the cardiac signal sensor 170, the second highest priority 2 is set to the pulse sensor 164 and the blood pressure sensor 166, and the lowest priority 3 is set to the other sensors 160.

Also, for example, for a health check with a focus on the amount of exercise of a user, the service definition table is set so that the pulse sensor 164, the sweating sensor 162, the cardiac signal sensor 170, the body temperature sensor 172, the pedometer 188, the acceleration sensor 180, and the velocity sensor 182 are used.

In this case, for example, the highest priority 1 is set to the pulse sensor 164, the pedometer 188, the cardiac signal sensor 170, and the body temperature sensor 172, and the second highest priority 2 is set to the other sensors 160 among the sensors 160 to be used.

Also, for example, for a health check with a focus on the brain condition of a user, the service definition table is set so that the blood pressure sensor 166, the brain wave sensor 168, the cardiac signal sensor 170, the body temperature sensor 172, and the blood component sensor 174 are used.

In this case, for example, the highest priority 1 is set to the brain wave sensor 168, the second highest priority 2 is set to the cardiac signal sensor 170 and the blood component sensor 174, and the lowest priority 3 is set to the other sensors 160 among the sensors 160 to be used.

Also, for example, assume a case where the best result is obtained when one blood pressure sensor 166, one pulse sensor 164, and two brain wave sensors 168 (first set) are used, the second best result is obtained when one blood pressure sensor 166 and the pulse sensor 164 (second set) are used, and the third best result is obtained when only one blood pressure sensor 166 (third set) is used.

In this case, priorities are set to the sets of the sensors 160. For example, the highest priority 1 is set to the first set, the second highest priority 2 is set to the second set, and the lowest priority 3 is set to the third set.

Navigation Service

Hereinafter, an operation of the mobile station 2 and the fixed terminal 4 will be described with a specific example of a navigation service in which the position of the mobile station 2 and the fixed terminal 4 is displayed on a map.

Figure 13:
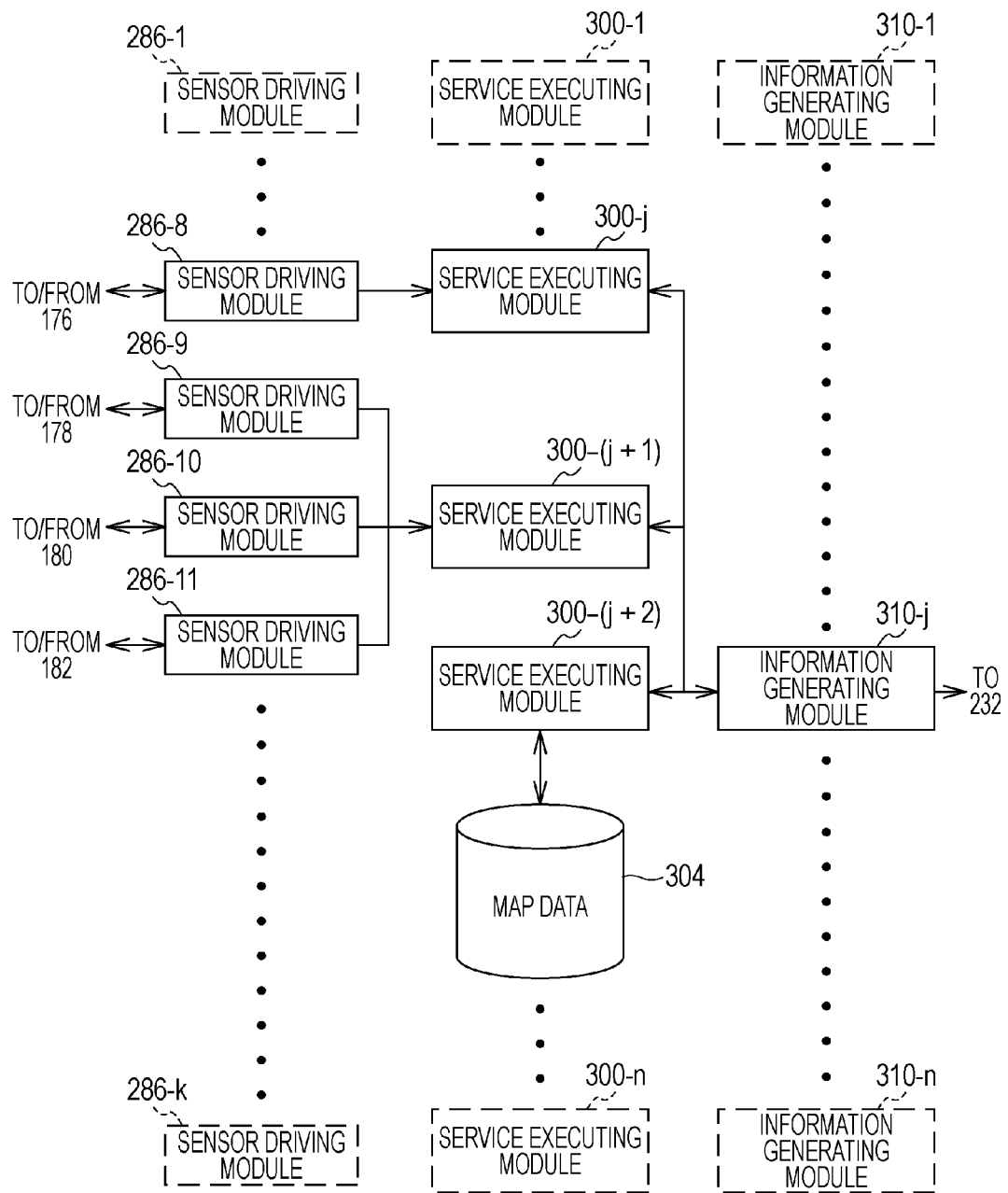
FIG. 13 illustrates a second information service (navigation service) provided by the mobile station and the fixed terminal illustrated in FIG. 1.

FIG. 13 illustrates the second information service (navigation service) provided by the mobile station 2 and the fixed terminal 4.

As illustrated in FIG. 13, in a case where the mobile station 2 and the fixed terminal 4 provide a navigation service as an information service, the GPS 176, the direction sensor 178, the acceleration sensor 180, and the velocity sensor 182 are selected as the sensors 160, and the sensor driving modules 286-8, 286-9, 286-10, and 286-11 compatible therewith are loaded to the sensor control unit 270 and are executed.

Also, for example, a service executing module 300-j that obtains the latitude and longitude of the mobile station 2 and the fixed terminal 4 on the basis of sensor information input from the GPS 176 is loaded to the module execution control unit 266.

Also, a service executing module 300-(j+1) that obtains the latitude and longitude of the mobile station 2 and the fixed terminal 4 by performing an integrating process on sensor information input from the direction sensor 178, the acceleration sensor 180, and the velocity sensor 182 is loaded to the module execution control unit 266.

Also, map data 304 is set as a service execution parameter. A service executing module 300-(j+2) that generates map data based on the latitude and longitude supplied from the service executing module 300-j when the GPS 176 is normally operating and that generates map data based on the latitude and longitude supplied from the service executing module 300-(j+1) when the GPS 176 is not normally operating is loaded to the module execution control unit 266.

Also, an information generating module 310-j that generates a result of the navigation service in a predetermined format on the basis of the map data generated by the service executing module 300-(j+2) is loaded to the module execution control unit 266.

When the GPS 176, the priority thereof being higher than that of the direction sensor 178, the acceleration sensor 180, and the velocity sensor 182, is normally operating, the module execution control unit 266 allows the service executing module 300-j to process sensor information from the sensor driving module 286-8 and to output a process result to the information generating module 310-j.

When the GPS 176 is not normally operating, the module execution control unit 266 allows the service executing module 300-(j+1) to process sensor information from the sensor driving modules 286-9, 286-10, and 286-11 corresponding to the direction sensor 178, the acceleration sensor 180, and the velocity sensor 182, and to output a process result to the service executing module 300-(j+2).

When the state of the GPS 176 changes from an abnormal operation state to a normal operation state, the module execution control unit 266 allows the service executing module 300-j to process sensor information from the sensor driving module 286-8 again, and to output a process result to the service executing module 300-(j+2).

The service executing module 300-(j+2) generates map data corresponding to a process result (latitude and longitude) input from the service executing module 300-j or the service executing module 300-(j+1) and outputs the map data as a process result to the information generating module 310-j.

The information generating module 310-j generates a result of the navigation service in a predetermined format on the basis of the map data input from the service executing module 300-(j+2) and outputs the result to the information output unit 232 (FIG. 4) via the information generating unit 258, thereby presenting the result to the user.

Alternatively, a navigation service using the GPS 176 and a navigation service using the direction sensor 178, the acceleration sensor 180, and the velocity sensor 182 can be defined as different information services in the service definition table, and any of the services can be realized by specification by a user.

Image Information Generating Service

Hereinafter, an operation of the mobile station 2 and the fixed terminal 4 will be described with a specific example of providing an image information generating service as an information service. In the image information generating service, image data captured by the camera 150 (FIG. 2) or the like is stored, with information about a shooting site and a comment being attached to the image data.

Figure 14:
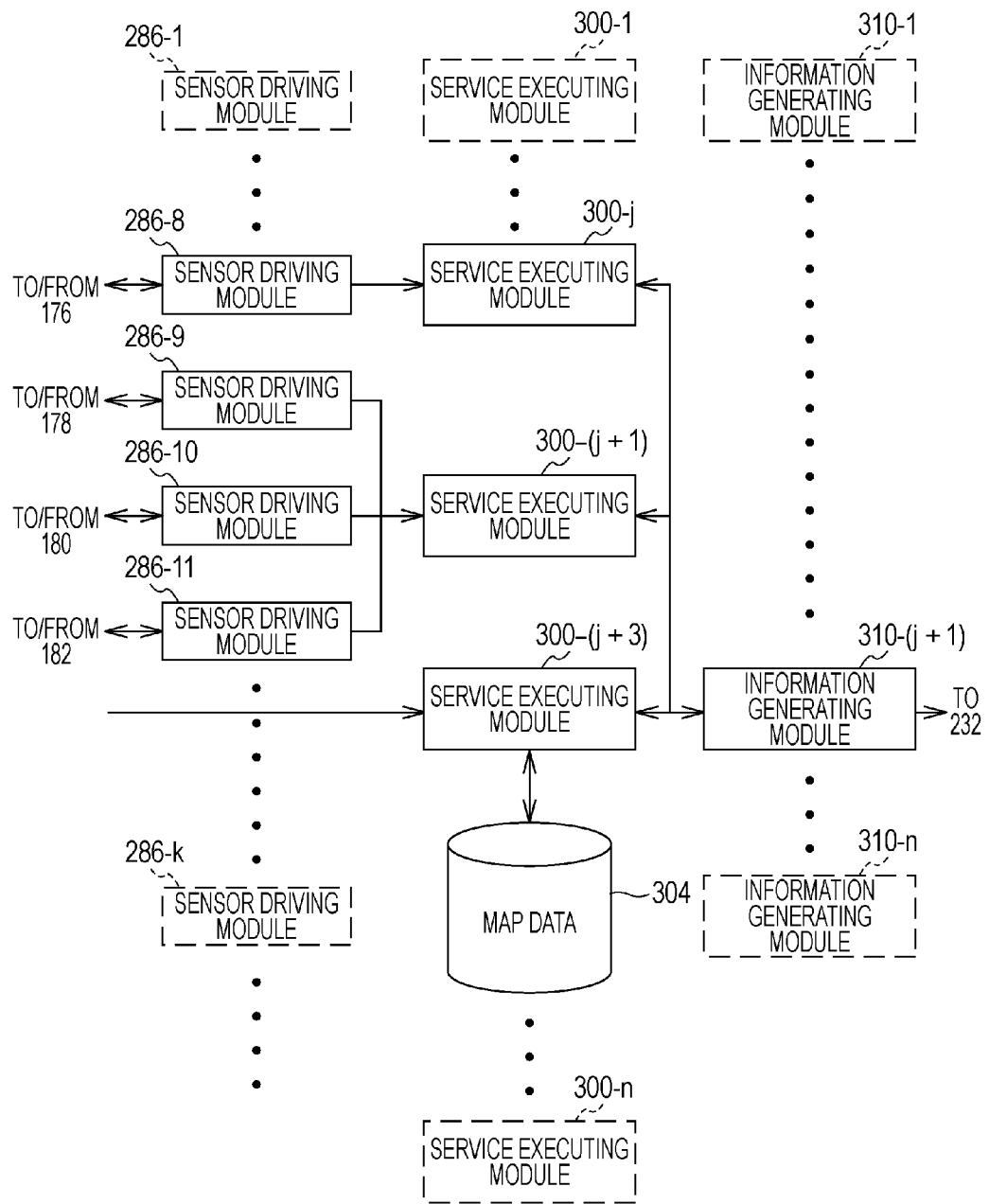
FIG. 14 illustrates a third information service (image information generating service) provided by the mobile station and the fixed terminal illustrated in FIG. 1.

FIG. 14 illustrates a third information service (image information generating service) provided by the mobile station 2 and the fixed terminal 4 illustrated in FIG. 1.

In order to provide the image information generating service, a service executing module 300-(j+3) and an information generating module 310-(j+1) are used instead of the service executing module 300-(j+2) and the information generating module 310-j that are used in the navigation service.

The service executing module 300-(j+3) has the function of the service executing module 300-(j+2). In addition, the service executing module 300-(j+3) attaches additional information, such as position information (latitude and longitude) of the mobile station 2 and the fixed terminal 4 obtained from any of the service executing modules 300-j and 300-(j+1), map information indicating a shooting site, and a comment input from the input device 146, etc., to moving and still images captured by the camera 150, and outputs the images as a process result to the information generating module 310-(j+1).

The additional information can be attached to an image in an arbitrary pattern and at an arbitrary timing specified by a user via the input device 146.

For example, the additional information is attached to each still image or each series of (each scene of) moving images. The additional information is attached in a visible or non-visible manner.

The information generating module 310-(j+1) generates a result of the predetermined information service on the basis of the process result input from the service executing module 300-(j+3) and outputs the result to the output device 148 via the information output unit 232 or stores the result in the memory 142 or a memory card (not illustrated) inserted into the CPU peripheral device 144.

In the service definition table illustrated in FIG. 6, the sensors 160, the service executing modules 300, and the information generating modules 310 that are used in a plurality of types of health checks, a plurality of types of navigation services, and a plurality of types of image information generating services can be defined.

Furthermore, for each of those services, appropriate parameters can be set in the sensor parameter table, the service execution parameter table, and the information generation parameter table illustrated in FIGS. 8 and 7.

In a case where there is no need to obtain modules and parameters from the module/parameter server apparatus 6, the mobile station 2 used in the third information service described above can be realized by a single digital camera provided with a GPS function and sensors such as the pulse sensor 164.

By defining the above-described plurality of types of health checks, various types of navigation services, and various types of image information generating services, by setting parameters for the services, and by preparing the sensor driving modules 286, the service executing modules 300, and the information generating modules 310 appropriate for those information services, various types of health checks, various types of navigation services, and various types of image information generating services can be provided in accordance with specification by a user of the mobile station 2 and the fixed terminal 4.

Also, by defining information services other than the above-described three types of information services, by setting parameters for the services, and by preparing the sensor driving modules 286, the service executing modules 300, and the information generating modules 310 necessary to provide those information services, various types of information services other than those described above can be provided.

Second Embodiment

Hereinafter, a second embodiment of the disclosure of the present application will be described with a specific example of a Web browsing service, which is an information service performed in the information service providing system 1. In the Web browsing service, the operation of the terminal program 20 (FIG. 4) is changed so that a component of Web content in which a user who browses the Web content is interested can be detected.

FIG. 15 is a second diagram illustrating a second service definition table stored in the input analyzing DB 242 illustrated in FIG. 4.

The input analyzing DB 242 stores the second service definition table illustrated in FIG. 15 such that the input analyzing unit 240 can refer to the table.

Hereinafter, a difference between the first service definition table illustrated in FIG. 6 and the second definition table illustrated in FIG. 15 will be described.

The second service definition table shows the correspondence between information services that can be provided by the mobile station 2 and the fixed terminal 4 (FIG. 1) and one or more sets of the sensors 160 used in each of the information services ("services": S#1 to S#n) that can be provided.

The priorities of sets of the sensors 160 to be used are indicated by values of 1, 2, 3, . . . . FIG. 15 illustrates a case where the highest priority 1 is set to a first set of the sensors 160 (the sweating sensor 162, the pulse sensor 164, the brain wave sensor 168, and the viewpoint detecting sensor 186) used to realize the above-described Web browser function S#m as an information service, and the second highest priority is set to a second set (the sweating sensor 162 and the pulse sensor 164).

FIG. 16 is a second diagram illustrating a sensor parameter table stored in the parameter DB 248 illustrated in FIG. 4.

FIG. 17 is a second diagram illustrating a service execution parameter table stored in the parameter DB 248 illustrated in FIG. 4.

The parameter DB 248 stores the sensor parameter table illustrated in FIG. 16, the service execution parameter table illustrated in FIG. 17, and an information generation parameter table having the same configuration as that of the service execution parameter table illustrated in FIG. 17 such that the parameter setting unit 246 and the information obtaining unit 262 can refer to the tables.

As illustrated in FIG. 16, in the sensor parameter table used to realize the above-described Web browser function, sensor parameters $P_{mp}$ to $P_{m(p+1)}$) that are set to the sensor driving modules 286-1, 286-2, 286-4, and 286-13 corresponding to the sweating sensor 162, the pulse sensor 164, the brain wave sensor 168, and the viewpoint detecting sensor 186, and the service executing modules 300-p to 300-(p+2) are set.

Also, as illustrated in FIG. 17, service execution parameters and information generation parameters are set in the service execution parameter table and the information generation parameter table, respectively, for the service executing modules 300 and the information generating modules 310 used to realize the above-described Web browser function.

Operation of Information Service Providing System 1 According to Second Embodiment Hereinafter, an operation of the information service providing system 1 according to the second embodiment will be described.

Figure 18A:
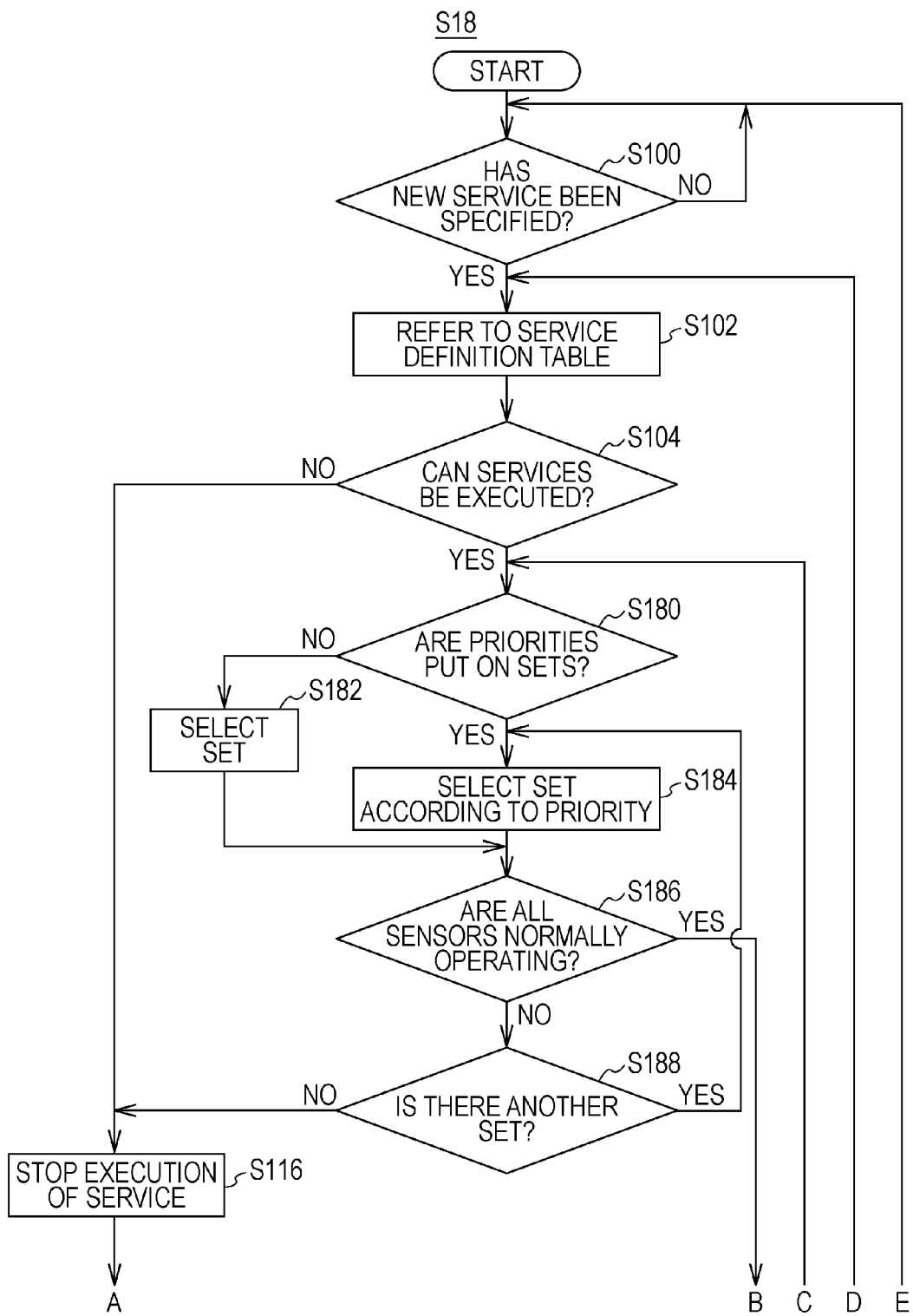
FIG. 18A is a first flowchart illustrating an operation according to a second embodiment of the information service providing system illustrated in FIG. 1.
Figure 18B:
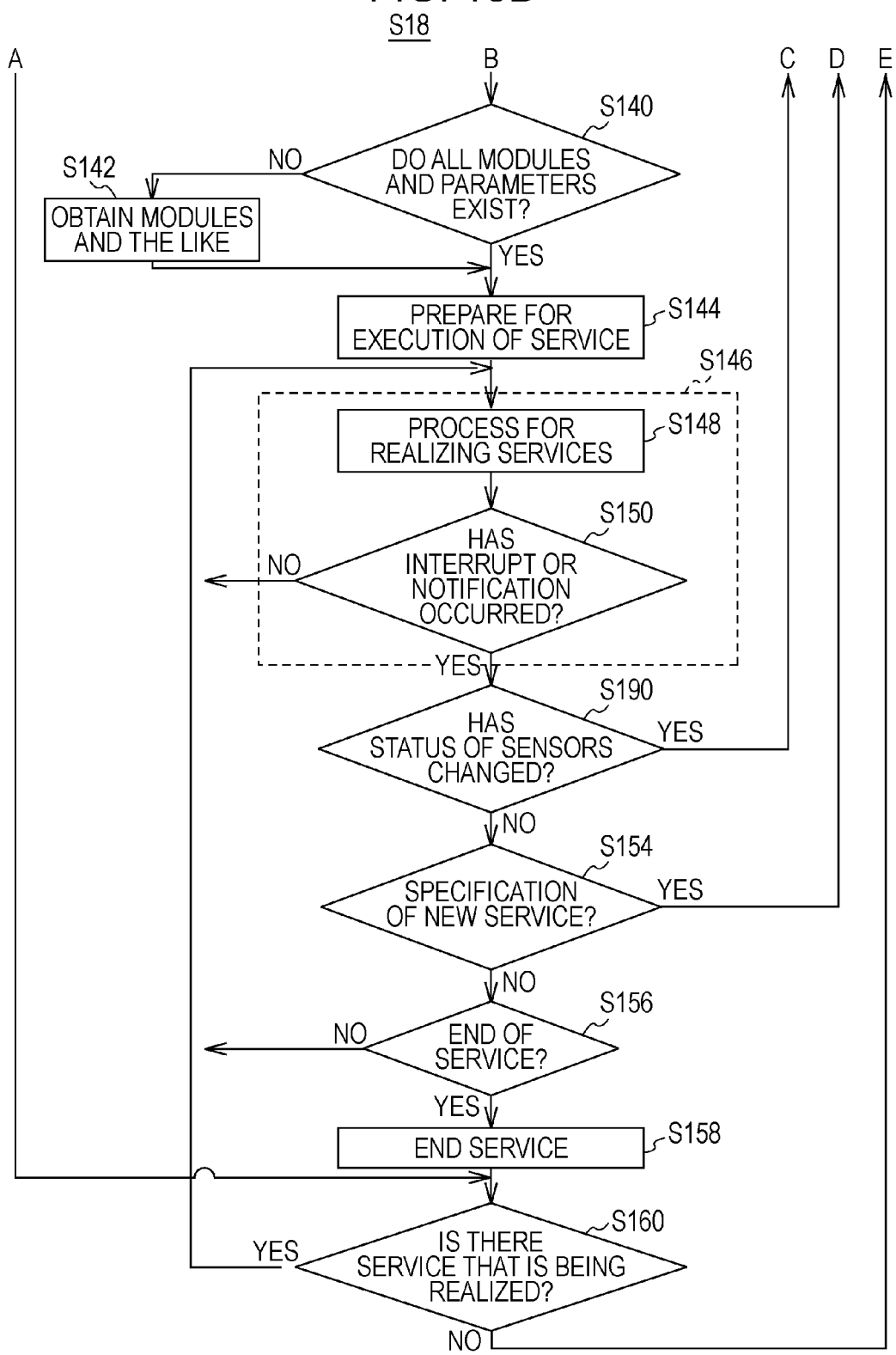
FIG. 18B is a second flowchart illustrating the operation according to the second embodiment of the information service providing system illustrated in FIG. 1.

FIGS. 18A and 18B are first and second flowcharts illustrating an operation (S18) according to the second embodiment of the information service providing system 1 illustrated in FIG. 1.

The symbols A to E illustrated in FIGS. 18A and 18B indicate flows of a process, that is, the lines denoted by the same symbols in these figures are connected to each other.

As illustrated in FIGS. 18A and 18B, the terminal program 20 (FIG. 4) is started in the mobile station 2 and the fixed terminal 4, the server program 60 (FIG. 9) is started in the module/parameter server apparatus 6, and the Web program 80 (FIG. 10) is started in the Web serve 8. Then, the terminal program 20 performs the same process as that in S100 illustrated in FIG. 11A.

In step S102 (S102), the terminal program 20 performs the same process as that in S102 illustrated in FIG. 11A.

That is, the input analyzing unit 240 of the terminal program 20 performs a process with reference to the service definition table (FIG. 15), and the module execution control unit 266 performs a process for estimating overlap of resources and the amount of process.

In step 104 (S104), the terminal program 20 performs the same process as that in S104 illustrated in FIG. 11A. If there is an inexecutable information service, a process to stop execution of the inexecutable information service is performed (S116). Otherwise, the terminal program 20 proceeds to step 180 (S180).

In S180, the sensor selecting unit 272 determines whether priorities are put on sets of the sensors 160 necessary to realize a newly-specified information service in the service definition table (FIG. 15).

If priorities are put on sets of the sensors 160, the terminal program 20 proceeds to step 184 (S184). Otherwise, the terminal program 20 proceeds to step 182 (S182).

In S182, the sensor selecting unit 272 selects the set of sensors 160 (sensor driving modules 286) necessary to realize the newly-specified information service in the service definition table (FIG. 15).

In S184, the sensor selecting unit 272 selects the set of the sensors 160 that has not yet been a target of the process in S180 and that has the highest priority in the service definition table from among usable sets of the sensors 160 necessary to realize the newly-specified information service.

The sensor control unit 270 sets the sensor parameters P (FIG. 16) input from the parameter DB 248 to the sensors 160 (sensor driving modules 286) selected by the sensor selecting unit 272 and starts the sensors 160.

In step 186 (S186), the sensor control unit 270 determines whether all the sensors included in the set of the sensors 160 (sensor driving modules 286) started in S184 are normally operating.

If all the sensors 160 are normally operating (e.g., if all of the sweating sensor 162, the pulse sensor 164, the brain wave sensor 168, and the viewpoint detecting sensor 186 are normally operating), the terminal program 20 proceeds to step 140 (S140). Otherwise, the terminal program 20 proceeds to step 188 (S188).

In S188, the sensor selecting unit 272 determines whether there is another set of sensors 160 that has not been a target of the process in S180 at the time among the sets of sensors 160 (sensor driving modules 286) necessary to realize the newly-specified information service.

If there is another set of sensors 160, the terminal program 20 returns to S184. Otherwise, the terminal program 20 proceeds to S116, where the module execution control unit 266 and the sensor control unit 270 perform a process to stop the newly-specified information service.

In step 140 (S140), the terminal program 20 performs the same process as that in S140 illustrated in FIG. 11B.

In step 142 (S142), the terminal program 20 performs the same process as that in S142 illustrated in FIG. 11B.

In step 146 (S146), the terminal program 20 performs the same process as that in S146 illustrated in FIG. 11B.

That is, the module execution control unit 266 performs a process to realize respective information services and outputs results of the respective information services (S148).

During the process for realizing the respective information services, the terminal program 20 determines whether a phenomenon such as a change in status of the sensor 160 has occurred (S150).

If an interrupt has occurred, the module execution control unit 266 proceeds to step 190 (S190). Otherwise, the process remains in step S146.

In S190, the module execution control unit 266 determines whether a change has occurred in the status of one or more sensors 160 (sensor driving modules 286) included in the set of the sensors 160 (sensor driving modules 286) that are operating to realize the respective information services.

That is, the module execution control unit 266 determines whether a phenomenon caused by a change in status of a sensor has occurred, e.g., one or more of the sensors 160 included in the set of the sensors 160 that had normally operated operate abnormally, or all the sensors 160 included in the set of the sensors 160 that had abnormally operated operate normally in order to realize the respective information services.

If a phenomenon caused by a change in status of the sensors used to realize an information service occurs, the terminal program 20 returns to S180 under a state where the set of the sensors 160 used to realize the information service is not the target of S180. Otherwise, the terminal program 20 proceeds to step 154 (S154).

In step 154 (S154), the terminal program 20 performs the same process as that in S154 illustrated in FIG. 11B.

In step 156 (S156), the terminal program 20 performs the same process as that in S156 illustrated in FIG. 11B.

In step 158 (S158), the terminal program 20 performs the same process as that in S158 illustrated in FIG. 11B.

In step 160 (S160), the terminal program 20 performs the same process as that in S160 illustrated in FIG. 11B.

Display of Web Content and Detection of Interest

Hereinafter, a fourth information service provided by the mobile station 2 and the fixed terminal 4 will be described.

Figure 19:
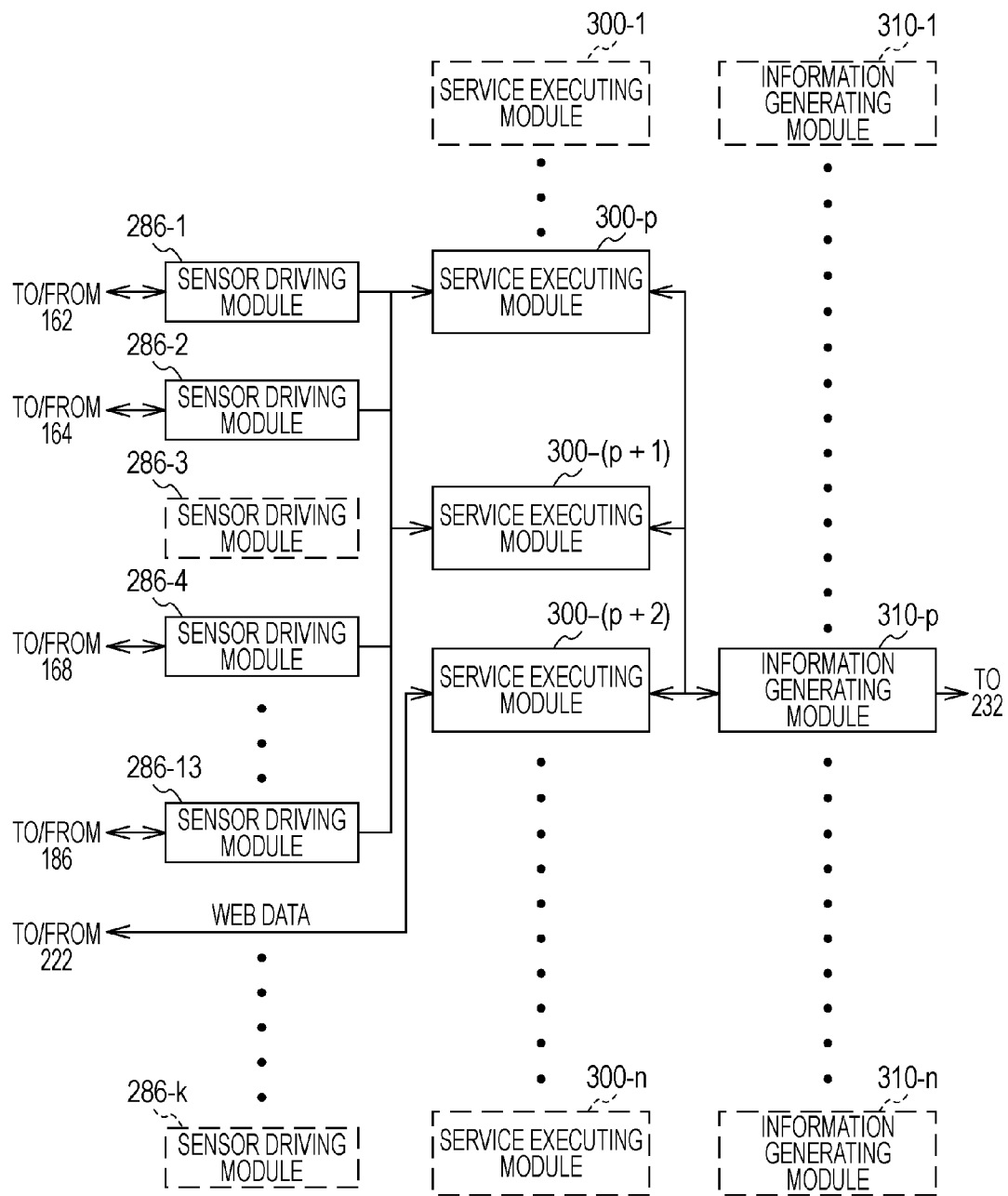
FIG. 19 illustrates an information service of displaying Web content and detecting an interest of a user in a component of the Web content in the information service providing system.

FIG. 19 illustrates an information service of displaying Web content and detecting an interest of a user with respect to a component of the Web content in the information service providing system 1.

The sensor driving modules 286, the service executing modules 300-p to 300-(p+1), and the information generating module 310-p illustrated in FIG. 19 are selected by the module selecting unit 252, and parameters P and P' for the respective modules are set by the parameter setting unit 246.

Referring to FIG. 19, the sensor driving module 286-1 operates the sweating sensor 162 attached to the hand of a user, detects whether the user is sweating and the amount of sweating, and outputs information indicating the sweating and the amount of sweating to the service executing module 300-p.

The sensor driving module 286-2 operates the pulse sensor 164 attached to the hand of a user, detects the pulses of the user of the mobile station 2 and the fixed terminal 4, and outputs information indicating the pulses of the user to the service executing module 300-p.

The sensor driving module 286-4 operates the brain wave sensor 168 attached to the head of a user, detects brain waves of the user, and outputs information indicating the brain waves of the user to the service executing module 300-p.

The sensor driving module 286-13 operates the viewpoint detecting sensor 186 attached to the head of a user, detects the position (viewpoint) of the Web content displayed on the output device 148 (FIG. 2) at which the user is looking, and outputs information indicating the viewpoint of the user to the service executing module 300-p.

The service executing module 300-(p+2) is a so-called a Web browser, obtains Web content from the Web server 8, and displays the Web content to the user of the mobile station 2 and the fixed terminal 4 via the information generating module 310 and the output device 148.

Also, the service executing module 300-(p+1) notifies the service executing module 300-p of the respective positions of elements contained in the Web content.

In a case where all the sensors 160 included in the first set having the highest priority (the sweating sensor 162, the pulse sensor 164, the brain wave sensor 168, and the viewpoint detecting sensor 186: FIG. 15) are usable, the service executing module 300-p associates information indicating the viewpoint of the user obtained from the viewpoint detecting sensor 186 with the positions of the elements of the Web content input from the service executing module 300-(p+2), and detects the element of the Web content at which the user is looking (advertisement, banner, photo, sentence, or the like).

Furthermore, the service executing module 300-p processes the information obtained from the sweating sensor 162, the pulse sensor 164, and the brain wave sensor 168, and determines whether the user is interested in the element at which the user is looking.

When the service executing module 300-p determines that the user is interested in any of the elements of the Web content, the service executing module 300-(p+1) processes the information obtained from the sweating sensor 162, the pulse sensor 164, and the brain wave sensor 168, and quantitatively calculates the level of interest.

The information generating module 310 associates the element in which the user is interested with the information indicating the level of interest, and outputs it as a result of the information service in a predetermined format to the output device 148 or the like.

In a case where any one or more of the sensors 160 included in the first set having the highest priority (the sweating sensor 162, the pulse sensor 164, the brain wave sensor 168, and the viewpoint detecting sensor 186) are unusable and where the second set having a lower priority (the sweating sensor 162 and pulse sensor 164) is usable, the service executing module 300-p processes the information obtained from the sweating sensor 162 and the pulse sensor 164, associates the information with the element of the Web content displayed on the output device 148 at each time and its display time, and estimates the element in which the user is interested.

In a case where the service executing module 300-p estimates that the user is interested in any of the elements of the Web content, the service executing module 300-(p+1) processes the information obtained from the sweating sensor 162 and the pulse sensor 164 and quantitatively calculates the level of interest.

The information generating module 310 associates the element in which the user is interested with the information indicating the level of interest, and outputs it as a result of the information service in a predetermined format to the output device 148 or the like.

In a case where the element of the Web data in which the user is interested in detected in the above-described manner indicates the address of information, such as a URL (Uniform Resource Location), the service executing module 300-(p+1) obtains information indicated by the element automatically or in accordance with a predetermined operation by the user, and outputs the information to the output device 148 or the like via the information generating module 310.

Hereinafter, a description will be given about a process of the terminal program 20 in a case where there exist three or more sets of the sensors 160 for realizing an information service.

FIG. 20 is a flowchart illustrating a process (S20) of the terminal program 20 (FIG. 4) in a case where there exist three or more sets of the sensors 160 for realizing an information service.

As illustrated in FIG. 20, in step 200 (S200), the terminal program 20 initializes a parameter "n" to 1 after starting the process.

In step 202 (S202), the terminal program 20 determines whether all the sensors 160 (sensor driving modules 286) included in a set having the n-th priority are usable.

If all the sensors 160 included in the set having the n-th priority are usable, the terminal program 20 proceeds to step 206 (S206). Otherwise, the terminal program 20 proceeds to step 204 (S204).

In S204, the terminal program 20 increments the parameter "n" (n=n+1).

In S206, the terminal program 20 performs a process to provide an information service by using the set of sensors 160 having the n-th priority.

In step 208 (S208), the terminal program 20 determines whether there is a set of sensors 160 having the n+1-th priority.

If there is the set of sensors 160 having the n+1-th priority, the terminal program 20 returns to S202. Otherwise, the terminal program 20 ends the process.

It can be easily understood by those skilled in the art that the process of the terminal program 20 according to the second embodiment can be applied to the first to third information services described above in the first embodiment.

The above-described embodiments are presented for examples and explanations, and cover not all the embodiments of the disclosure of the present application.

The above-described embodiments are not intended to limit the technical scope of the disclosure of the present application to the content of the disclosure, and can be variously changed or modified in accordance with the content of the disclosure.

The above-described embodiments are selected and described so that the principle and practical applications of the disclosure of the present application can be optimally described. Therefore, those skilled in the art can use the disclosure of the present application and the embodiments thereof for all possible practical applications by adding various changes for optimization on the basis of the content of the disclosure of the above-described embodiments.

The technical scope of the disclosure of the present application is intended to be defined by the description thereof and equivalents.

The disclosure of the present application can be used to provide a health check service.

What is claimed is:

1. An image capturing system comprising:
a module and/or parameter providing apparatus; and
an image capturing apparatus that is connected to the module and/or parameter providing apparatus and that can execute a plurality of sensor driving modules, a plurality of service executing modules, and a plurality of output modules,
wherein the module and/or parameter providing apparatus provides, to the image capturing apparatus in response to a request from the image capturing apparatus, components of one or more selection target modules including, as a component, one or more of
one or more of the sensor driving modules, one or more of the service executing modules, one or more of the output modules,
one or more sensor setting parameters that are set to the respective sensor driving modules compatible with the sensor setting parameters and that are used for a process of the sensor driving modules,
one or more process setting parameters that are set to the respective service executing modules compatible with the process setting parameters and that are used for a process of the service executing modules, and
one or more output setting parameters that are set to the respective output modules compatible with the output setting parameters and that are used for a process of the output modules,
wherein the image capturing apparatus includes
an input device configured to receive an input of specifying a plurality of image capturing services and specifying a method for adding position information to image information obtained through the specified image capturing services,
a selector configured to select a component of the selection target modules necessary to realize the specified image capturing services on the basis of correspondence information that indicates correspondence between each of the plurality of image capturing services and one or more of the components of the selection target modules necessary to realize the image capturing services,
an information obtaining unit configured to request a component of the selection target module that is necessary to realize the specified image capturing services and that does not exist in the image capturing apparatus to the module and/or parameter providing apparatus and to receive the component provided in response to the request,
a plurality of types of position sensors each of which is compatible with any of the sensor driving modules and detects position information indicating the position of the image capturing apparatus in accordance with the type of position sensor,
a parameter setting unit configured to set the sensor setting parameters, the process setting parameters, and the output setting parameters to the sensor driving modules, the service executing modules, and the output modules compatible with the parameters,
an executing device configured to execute the sensor driving modules, the service executing modules, and the output modules on which the setting has been performed in accordance with the specified image capturing services, and receive and/or transmit information input and/or output between the modules so that the specified image capturing services are realized, thereby realizing the specified image capturing services,
an output device configured to output a result of the one or more realized image capturing services,
a camera configured to shoot an object and generate image information of still and moving images of the object or any of the still and moving images, and
a storage device configured to store information, wherein the sensor driving module that is executed drives the position sensor compatible with the sensor driving module to detect position information according to the type of the position sensor and outputs the position information to the service executing module,
wherein the service executing module that is executed adds the position information output from the sensor driving module to the image information obtained from the camera in an externally-specified form and outputs the image information and the position information as a process result to the output module, and
wherein the output module that is executed generates a result of the realized image capturing services on the basis of the process result output from the service executing module and performs an output of the generated result to the output device and storage of the generated result in the storage device or any of the output and the storage.

2. An image capturing apparatus comprising:
one or more sensor driving modules;
one or more service executing modules;
an input device configured to receive an input of specifying a plurality of image capturing services and a method for adding position information to image information obtained through the specified image capturing services;
a selector configured to select the one or more sensor driving modules and the one or more service executing modules necessary to realize the specified image capturing services on the basis of correspondence information indicating correspondence between each of the plurality of image capturing services and the one or more sensor driving modules and the one or more service executing modules necessary to realize the image capturing services, and to select one or more of sensor setting parameters and one or more of process setting parameters necessary to realize the specified image capturing services on the basis of the correspondence information indicating the correspondence between each of the plurality of image capturing services and one or more of the sensor setting parameters and one or more of the process setting parameters necessary to realize the image capturing services;
a parameter setting unit configured to set one or more sensor setting parameters to the sensor driving modules compatible with the sensor setting parameters, the sensor setting parameters being used for a process of the sensor driving modules, and to set one or more process setting parameters to the service executing modules compatible with the process setting parameters, the process setting parameters being used for a process of the service executing modules;
a plurality of types of position sensors each of which is compatible with any of the sensor driving modules and detects position information from an object of image capturing in accordance with the type of position sensor;
an executing device configured to execute the selected sensor driving modules and service executing modules to which the sensor setting parameters and the process setting parameters are set, and to receive and/or transmit information input and/or output between the modules so that the specified image capturing services are realized, thereby realizing the specified image capturing services; and a camera configured to shoot an object and generate image information of still and moving images of the object or any of the still and moving images, wherein the sensor driving module that is executed drives the position sensor compatible with the sensor driving module to detect position information of the object according to the type of the position sensor and outputs the position information as position sensor information, and wherein the service executing module that is executed adds the position information output from the sensor driving module to the image information obtained through capturing by the camera in an externally-specified form.

3. The image capturing apparatus according to claim 2, further comprising:

an output device configured to output a result of the one or more realized image capturing services;

a storage device configured to store information; and one or more output modules configured to process image information added with the position information output from the service executing modules, generate a result of the specified image capturing services in a predetermined form, and perform an output of the result to the output device or storage of the result in the storage device or any of the output and the storage.

4. The image capturing apparatus according to claim 3, further comprising:

one or more sensor setting parameters that are set to the respective sensor driving modules compatible with the sensor setting parameters and that are used for a process of the sensor driving modules;

one or more process setting parameters that are set to the respective service executing modules compatible with the process setting parameters and that are used for a process of the service executing modules;

one or more output setting parameters that are set to the respective output modules compatible with the output setting parameters and that are used for a process of the output modules; and a parameter setting unit configured to set the sensor setting parameters, the process setting parameters, and the output setting parameters to the sensor driving modules, the service executing modules, the output modules compatible to the parameters, wherein the selector further selects one or more of the sensor setting parameters, one or more of the process setting parameters, and one or more of the output setting parameters necessary to realize the specified image capturing services on the basis of the correspondence information further indicating correspondence between each of the image capturing services and one or more of the sensor setting parameters, one or more of the process setting parameters, and one or more of the output setting parameters necessary to realize the image capturing services, and wherein the executing device executes the sensor driving modules the service executing modules, and the output modules on which the setting has been performed, and receives and/or transmits information input and/or output between the modules so that the specified image capturing services are realized, thereby realizing the specified image capturing services.

5. The image capturing apparatus according to claim 4, further comprising:

a module providing device configured to provide, in response to a request, one or more of
 the one or more sensor driving modules,
 the one or more service executing modules,
 the one or more output modules,
 the one or more sensor setting parameters,
 the one or more process setting parameters, and
 the one or more output setting parameters; and an information obtaining unit configured to request, to the module providing device, one or more of
 the one or more sensor driving modules,
 the one or more service executing modules,
 the one or more output modules,
 the one or more sensor setting parameters,
 the one or more process setting parameters, and
 the one or more output setting parameters that are necessary to realize the specified image capturing services and that are not selected by the selector, and to receive one or more components provided in response to the request, wherein the selector further selects one or more of
 the one or more sensor driving modules,
 the one or more service executing modules,
 the one or more output modules,
 the one or more sensor setting parameters,
 the one or more process setting parameters, and
 the one or more output setting parameters that are provided by the module providing device.

6. The image capturing apparatus according to claim 2, wherein the plurality of position sensors are provided with priorities in the image capturing services in which the position sensors are used, and wherein, when a plurality of the position sensors are used in the specified image capturing services, the executing device supplies position sensor information output from the position sensors to one or more of the service executing modules used in the image capturing services in accordance with the priorities of the position sensors.

7. The image capturing apparatus according to claim 2, wherein priorities for realization are put on the one or more image capturing services, and wherein the executing device realizes the image capturing services that can be realized in accordance with the priorities put on the specified image capturing services.

8. The image capturing apparatus according to claim 2, further comprising:

a module providing device configured to provide, in response to a request, one or more of
 the one or more sensor driving modules,
 the one or more service executing modules,
 the one or more sensor setting parameters, and
 the one or more process setting parameters; and an information obtaining unit configured to request, to the module providing device, one or more of
 the one or more sensor driving modules,
 the one or more service executing modules,
 the one or more sensor setting parameters, and
 the one or more process setting parameters that are necessary to realize the specified image capturing services and that are not selected by the selector, and to receive one or more components provided in response to the request, wherein the selector further selects one or more of
the one or more sensor driving modules,
the one or more service executing modules,
the one or more sensor setting parameters, and
the one or more process setting parameters that are provided by the module providing device.

9. The image capturing apparatus according to claim 2, wherein each of the plurality of position sensors detects, as the position information, one or more of latitude and longitude, a moving direction, an acceleration, and a velocity of the image capturing apparatus.

10. An image capturing method for an image capturing apparatus including one or more sensor driving modules, one or more service executing modules, and a plurality of types of position sensors each of which is compatible with any of the sensor driving modules and detects position information from an object of image capturing in accordance with the type of position sensor, the image capturing method comprising:

receiving an input of specifying a plurality of image capturing services from an outside;

selecting the one or more sensor driving modules and the one or more service executing modules necessary to realize the specified image capturing services on the basis of correspondence information indicating correspondence between each of the plurality of image capturing services and the one or more sensor driving modules and the one or more service executing modules necessary to realize the image capturing services;

selecting one or more of sensor setting parameters and one or more of process setting parameters necessary to realize the specified image capturing services on the basis of the correspondence information indicating correspondence between each of the plurality of image capturing services and one or more of the sensor setting parameters and one or more of the process setting parameters necessary to realize the image capturing services;

setting the one or more sensor setting parameters to the sensor driving modules compatible with the sensor setting parameters, the sensor setting parameters being used for a process of the sensor driving modules, and setting the one or more process setting parameters to the service executing modules compatible with the process setting parameters, the process setting parameters being used for a process of the service executing modules; and executing the selected sensor driving modules and service executing modules to which the sensor setting parameters and the process setting parameters are set, receiving and/or transmitting information input and/or output between the modules so that the specified image capturing services are realized, thereby realizing the specified image capturing services;

wherein each of the sensor driving modules that are executed drives any of a plurality of types of position sensors that are compatible with the sensor driving modules and that detect position information of an object of image capturing according to the types, thereby detecting information according to the type of the position sensor and outputting the information as position sensor information, and wherein each of the service executing modules that are executed processes the position sensor information output from the executed sensor driving module and outputs a process result as a result of the specified image capturing services.

* * * * *